(12) United States Patent
Yeh et al.

(10) Patent No.: US 11,573,486 B2
(45) Date of Patent: Feb. 7, 2023

(54) NOTEBOOK COMPUTER

(71) Applicants: Hsin Yeh, Taipei (TW); Cheng-Hao Hsu, Taipei (TW); Ting-Hsuan Yu, Taipei (TW); Han-Tsai Liu, Taipei (TW); Jyh-Chyang Tzou, Taipei (TW); Chih-Wen Chiang, Taipei (TW)

(72) Inventors: Hsin Yeh, Taipei (TW); Cheng-Hao Hsu, Taipei (TW); Ting-Hsuan Yu, Taipei (TW); Han-Tsai Liu, Taipei (TW); Jyh-Chyang Tzou, Taipei (TW); Chih-Wen Chiang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 17/504,506

(22) Filed: Oct. 19, 2021

(65) Prior Publication Data
US 2022/0155668 A1 May 19, 2022

Related U.S. Application Data

(60) Provisional application No. 63/116,125, filed on Nov. 19, 2020.

(51) Int. Cl.
*G03B 29/00* (2021.01)
*G06F 1/16* (2006.01)
*G02B 5/30* (2006.01)

(52) U.S. Cl.
CPC .......... *G03B 29/00* (2013.01); *G06F 1/1616* (2013.01); *G06F 1/1686* (2013.01); *G02B 5/3025* (2013.01)

(58) Field of Classification Search
CPC ..... G03B 29/00; G06F 1/1616; G06F 1/1686; G02B 5/3025
See application file for complete search history.

(56) References Cited

U.S. PATENT DOCUMENTS 10,747,273 B1 8/2020 Wang et al.
2022/0206346 A1* 6/2022 Jiang ................ G02F 1/133528

FOREIGN PATENT DOCUMENTS

TW M577520 5/2019
TW M577522 5/2019

* cited by examiner

*Primary Examiner* — Minh Q Phan
(74) *Attorney, Agent, or Firm* — JCIPRNET

(57) ABSTRACT

A notebook computer including a screen, a body, and a camera module is provided. The body is pivotally connected to the screen so that the screen is opened and closed relative to the body. The camera module is stored in one of the screen and the body and includes a photosensitive element and a first polarizer. The first polarizer is disposed between the screen and the photosensitive element. The screen includes a display panel and a second polarizer. The second polarizer is disposed between the display panel and the first polarizer. The first polarizer and the second polarizer have different polarization directions.

19 Claims, 34 Drawing Sheets

NOTEBOOK COMPUTER

CROSS-REFERENCE TO RELATED APPLICATION

This application claims the priority benefit of U.S. provisional application Ser. No. 63/116,125, filed on Nov. 19, 2020. The entirety of the above-mentioned patent application is hereby incorporated by reference herein and made a part of this specification.

BACKGROUND

Technical Field

The invention relates to an electronic device, and in particular to a notebook computer.

Description of Related Art

In an existing notebook computer, a camera module is designed to face the user to extract the user's image. Under this design, problems such as poor shooting angles due to the position where the camera module is disposed is likely to be caused. For example, in a design of the camera module being disposed on the top of the screen (as shown in FIG. 1A), the user in a shot image may appear to be looking down (as shown in FIG. 1B). In a design of the camera module being disposed on the bottom of the screen (as shown in FIG. 2A), since the camera module shoots the user from a low angle, the user's nostrils and chin are captured (as shown in FIG. 2B). In a design of the camera module being disposed at the position of being on the keyboard (as shown in FIG. 3A), when the user is typing, the user's fingers are shot by the camera module (as shown in FIG. 3B).

SUMMARY

The invention provides a notebook computer, which avoids problems such as poor shooting angles.

According to some embodiments of the invention, a notebook computer includes a screen, a body, and a camera module. The body is pivotally connected to the screen, so that the screen is opened and closed relative to the body. The camera module is stored in one of the screen and the body and includes a photosensitive element and a first polarizer. The first polarizer is disposed between the screen and the photosensitive element. The screen includes a display panel and a second polarizer. The second polarizer is disposed between the display panel and the first polarizer. The first polarizer and the second polarizer have different polarization directions.

Based on the above, in the embodiment of the invention, the image light from the user is reflected to the photosensitive element through a light-reflecting element such as a screen, so that the problem of poor shooting angles caused by the position of disposing the camera module is avoided. In addition, the image light emitted from the screen is filtered through the first polarizer disposed between the screen and the photosensitive element, so that the photosensitive element obtains a clear user image.

To provide a further understanding of the above features and advantages of the disclosure, embodiments accompanied with drawings are described below in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
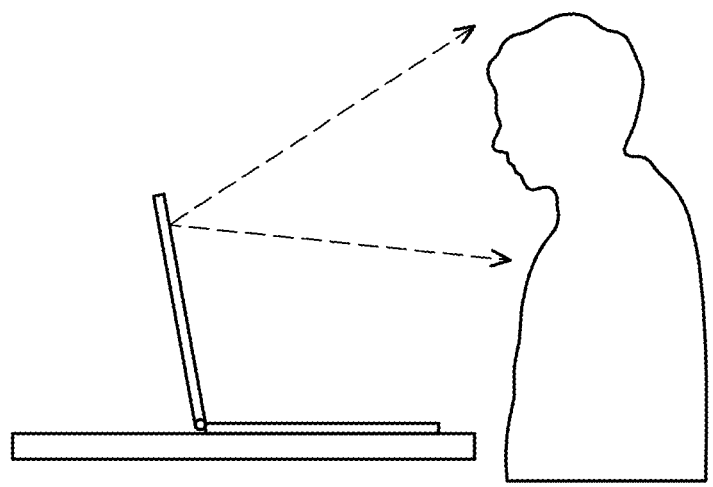
FIGS. 1A, 2A, and 3A respectively illustrate three notebook computers with video cameras disposed on the top of a screen, bottom of a screen, and at a keyboard position.
Figure 1B:
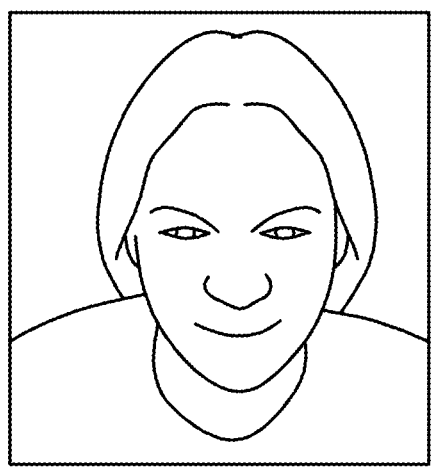
FIGS. 1B, 2B, and 3B respectively illustrate images captured by video lens of FIGS. 1A, 2A, and 3A.
Figure 2A:
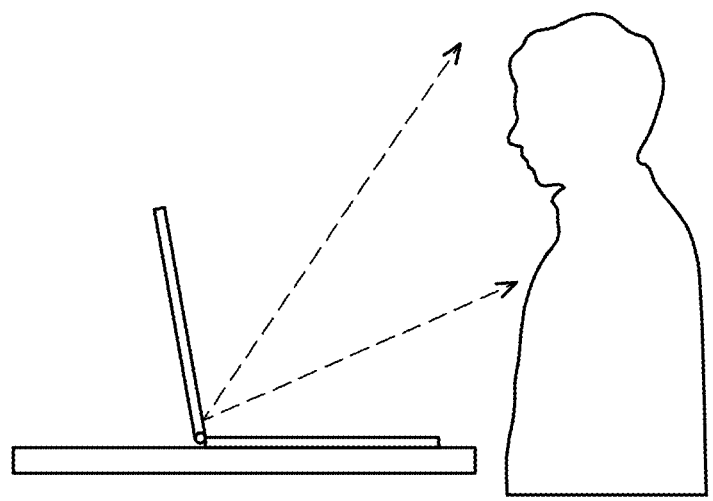
Figure 2B:
Figure 3A:
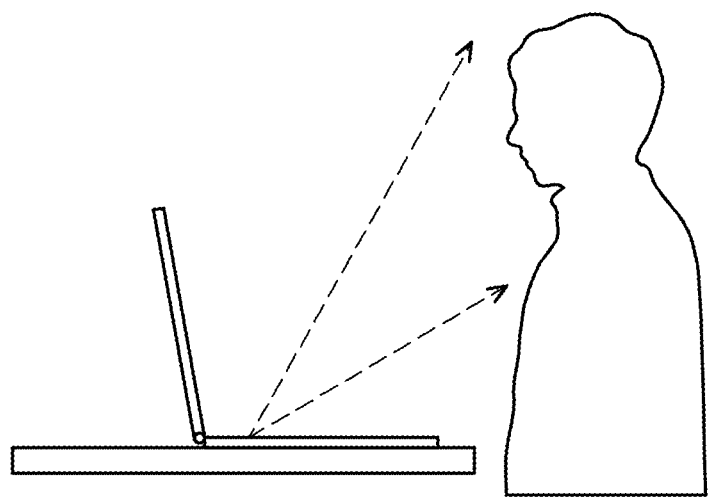
Figure 3B:
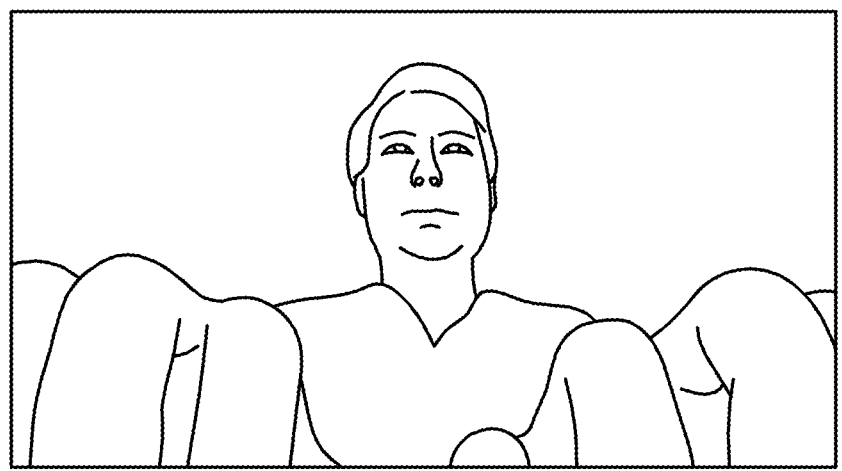

The direction terms mentioned in this document, such as "up", "down", "front", "rear", "left", "right", etc., only demonstrate the direction with reference to the attached drawings. Therefore, the direction terms used is to explain, not to limit the invention.

In the attached drawings, each drawing illustrates the general characteristics of a method, structure, or material used in a specific embodiment. However, these drawings should not be construed as defining or limiting the scope or properties covered by these embodiments. For example, for the sake of clarity, the relative dimension, thickness and position of each layer, area or structure might be reduced or enlarged.

In the following embodiment, same or similar reference numerals refer to the same or similar elements, and descriptions thereof will not be repeated. The features in different embodiments may be combined when there is no conflict, and simple equivalent changes and modifications made according to this specification or the claims are still within the scope covered by this patent.

The terms "first", "second", etc. mentioned in this specification or the claims are only used to name different elements or distinguish different embodiments or scopes, and are not used to limit the upper or lower limit of the number of elements, nor are they used to limit the manufacturing order or disposing order of elements.

Figure 4A:
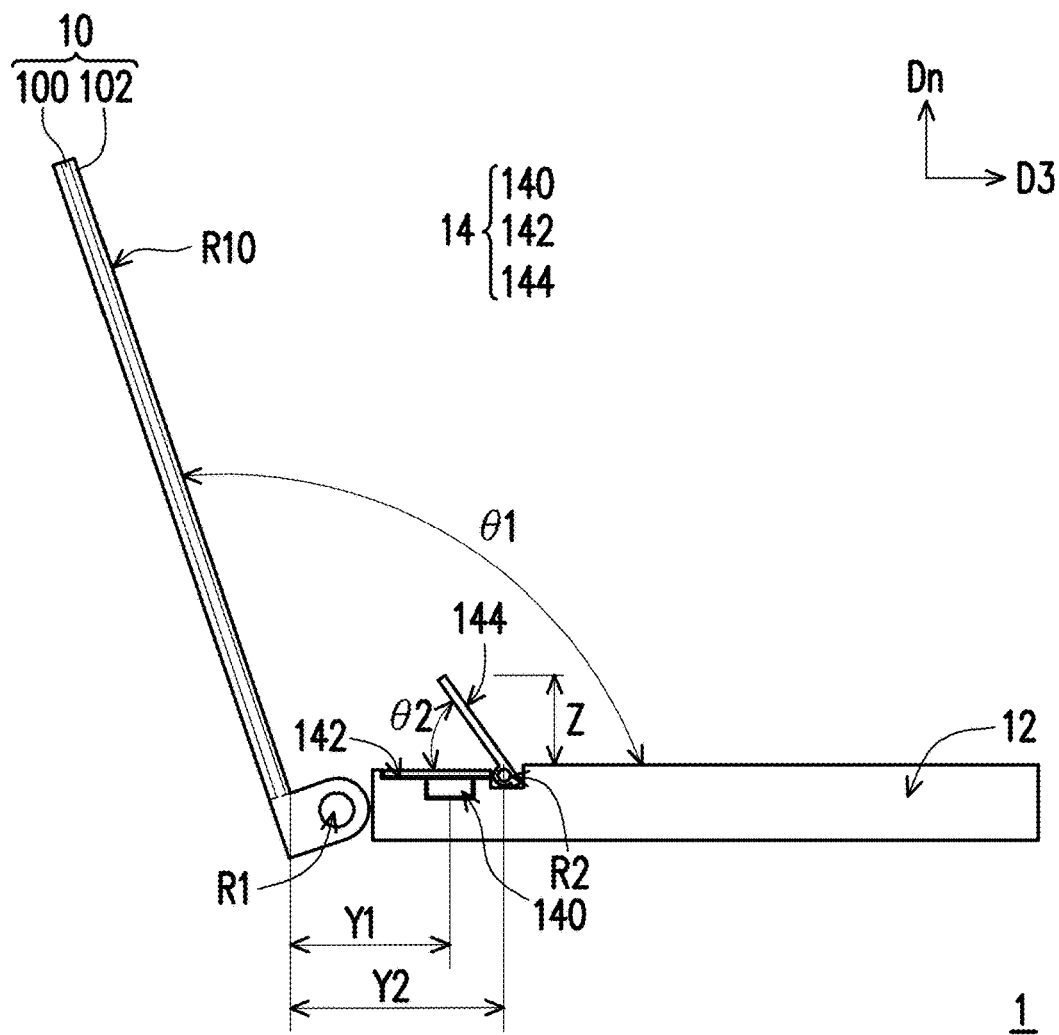
FIGS. 4A and 4B respectively are schematic cross-sectional views of a notebook computer in an open state and a closed state according to some embodiments of the invention.
Figure 4B:
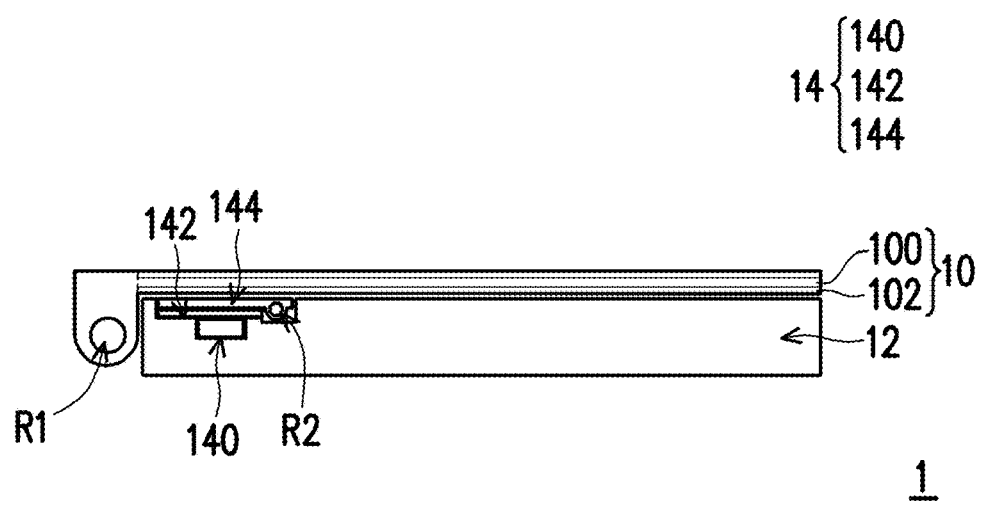
Figure 5:
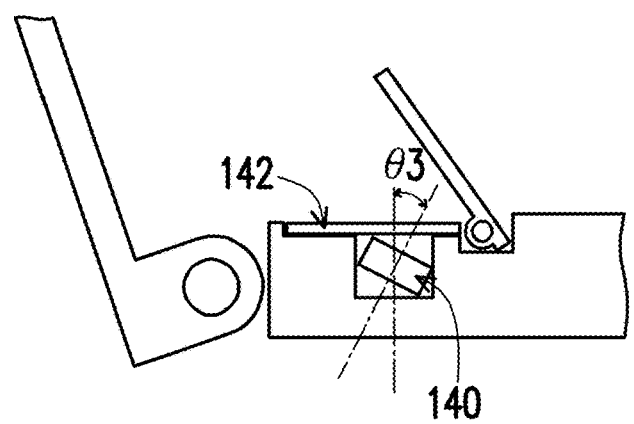
FIG. 5 is a schematic cross-sectional view of a portion of a notebook computer in the open state according to some embodiments of the invention.
Figure 6:
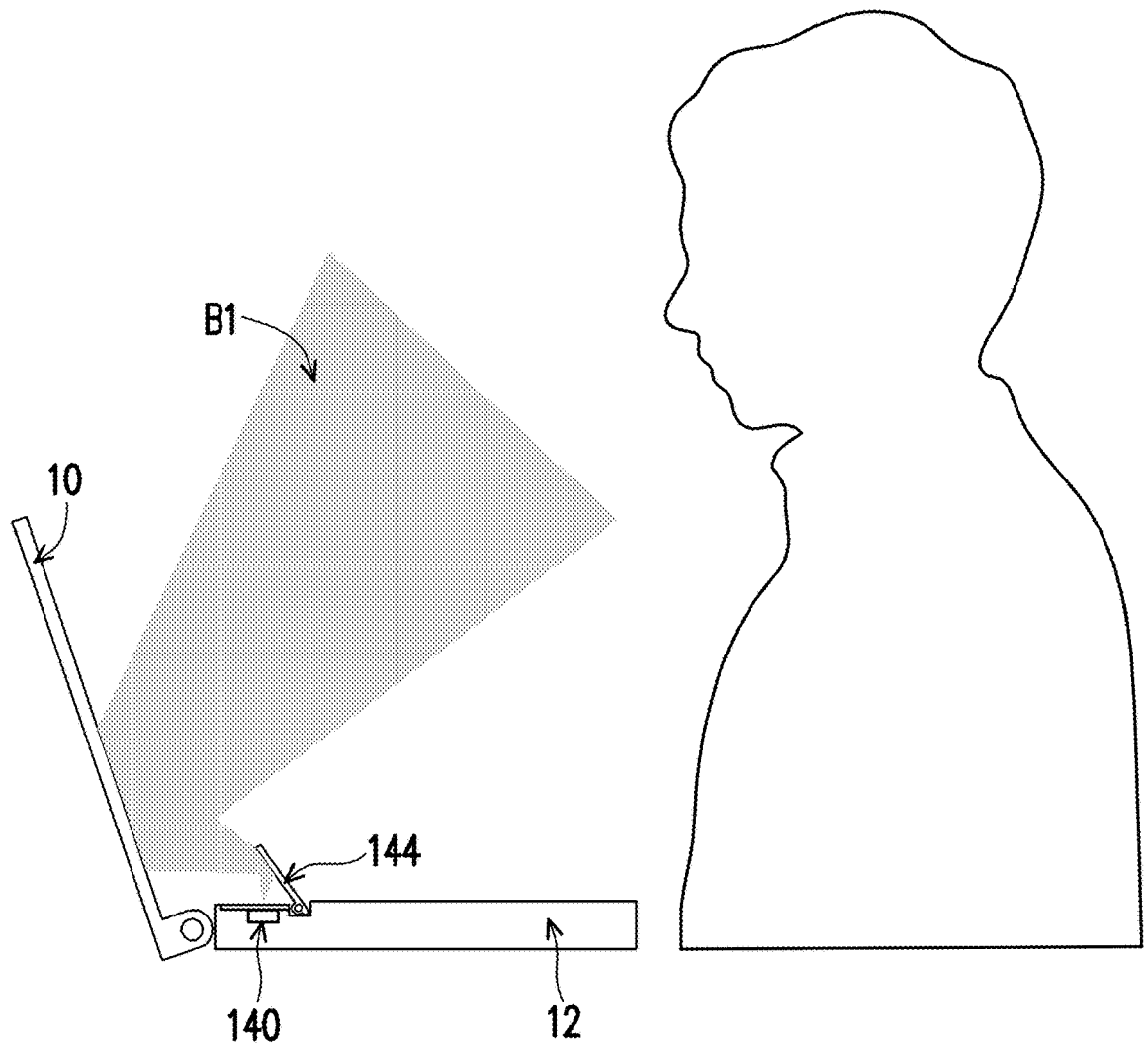
FIG. 6 is a schematic view of a light path, illustrating that image light from the user is transmitted to a photosensitive element through secondary reflection.
Figure 7:
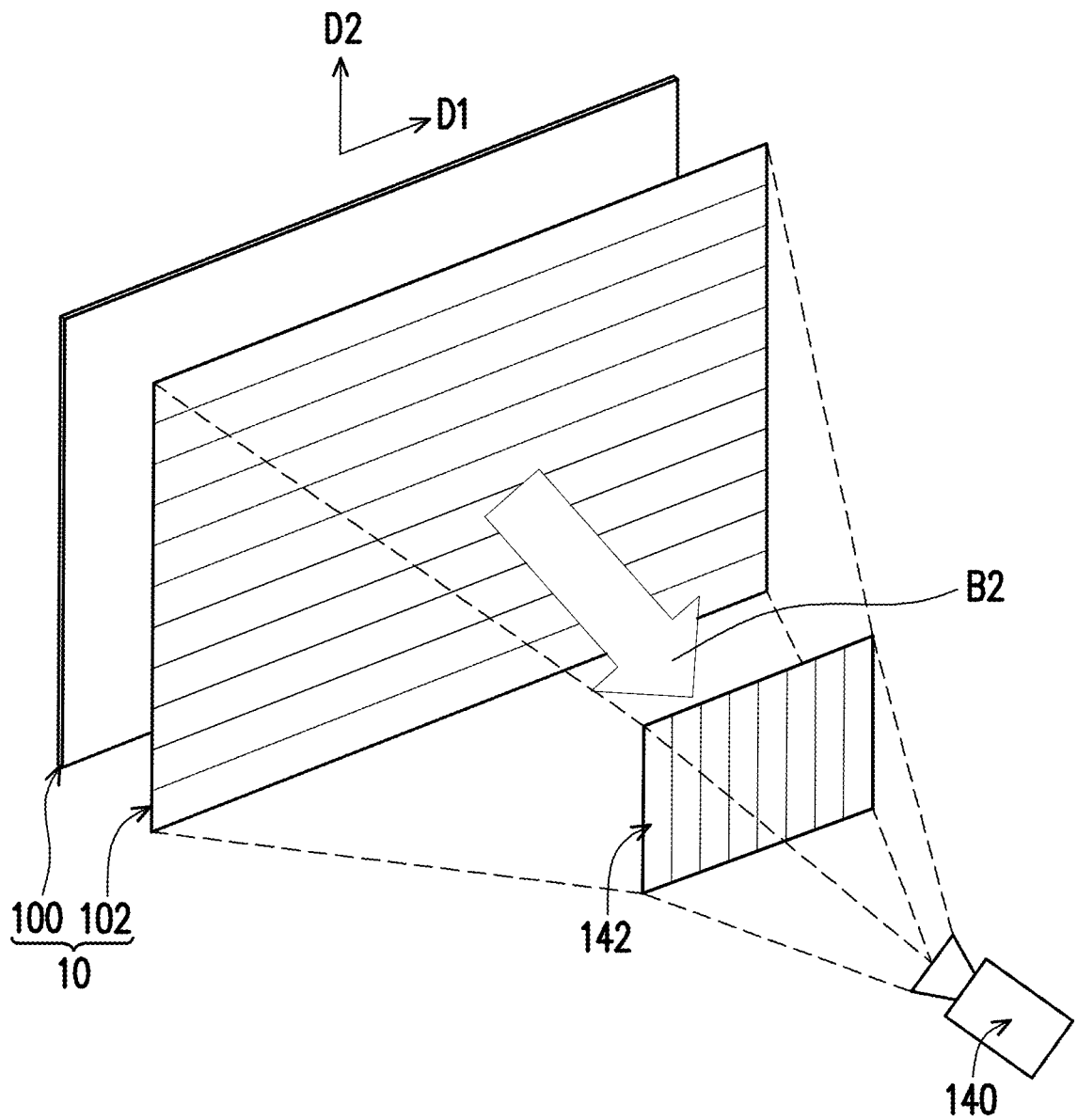
FIGS. 7 and 8 are two schematic exploded views, respectively illustrating two polarization direction combinations of a first polarizer and a second polarizer.
Figure 8:
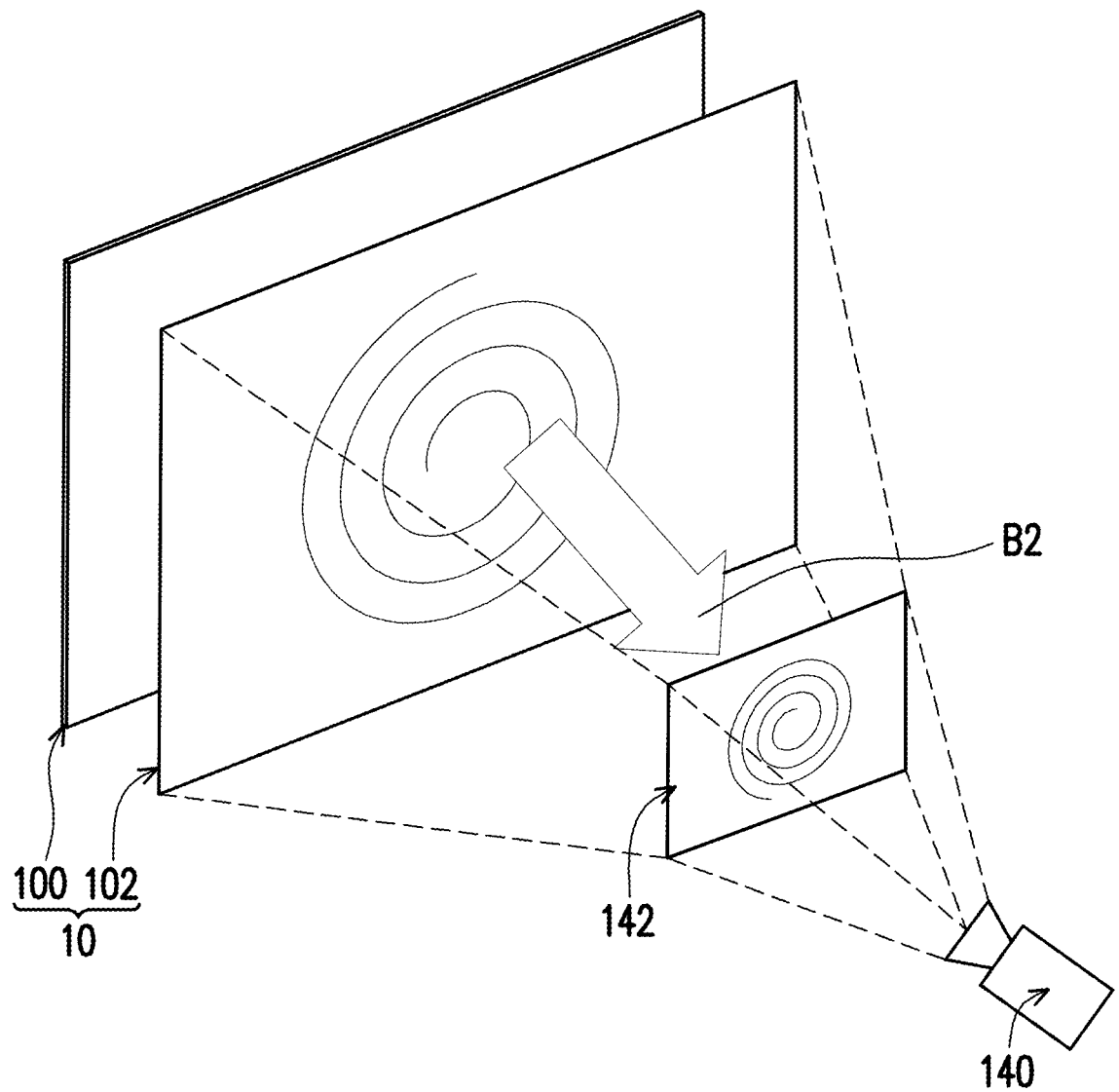
Figure 9:
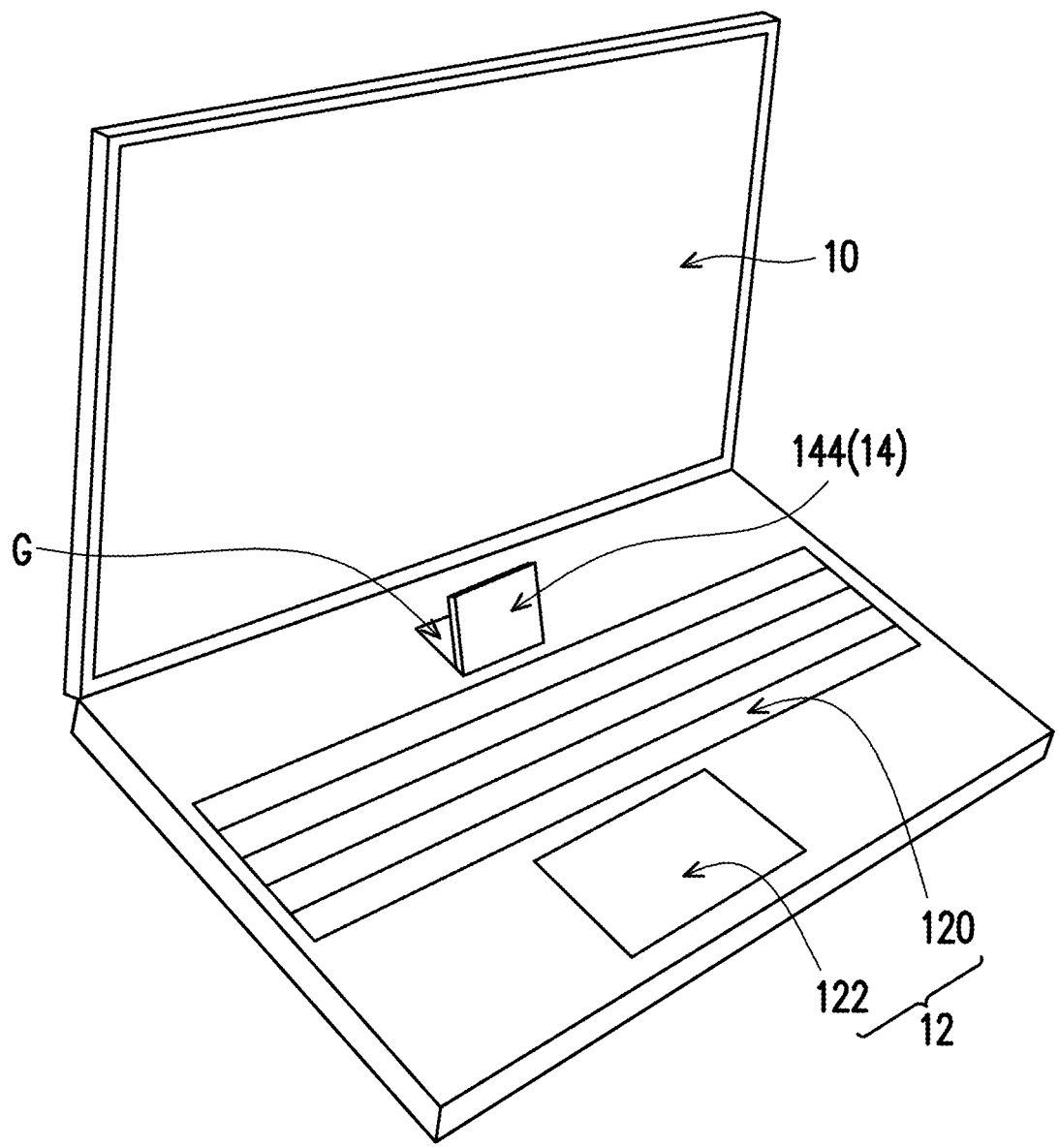
FIGS. 9 to 11 respectively are side schematic views of notebook computers in the open state according to some embodiments of the invention.
Figure 10:
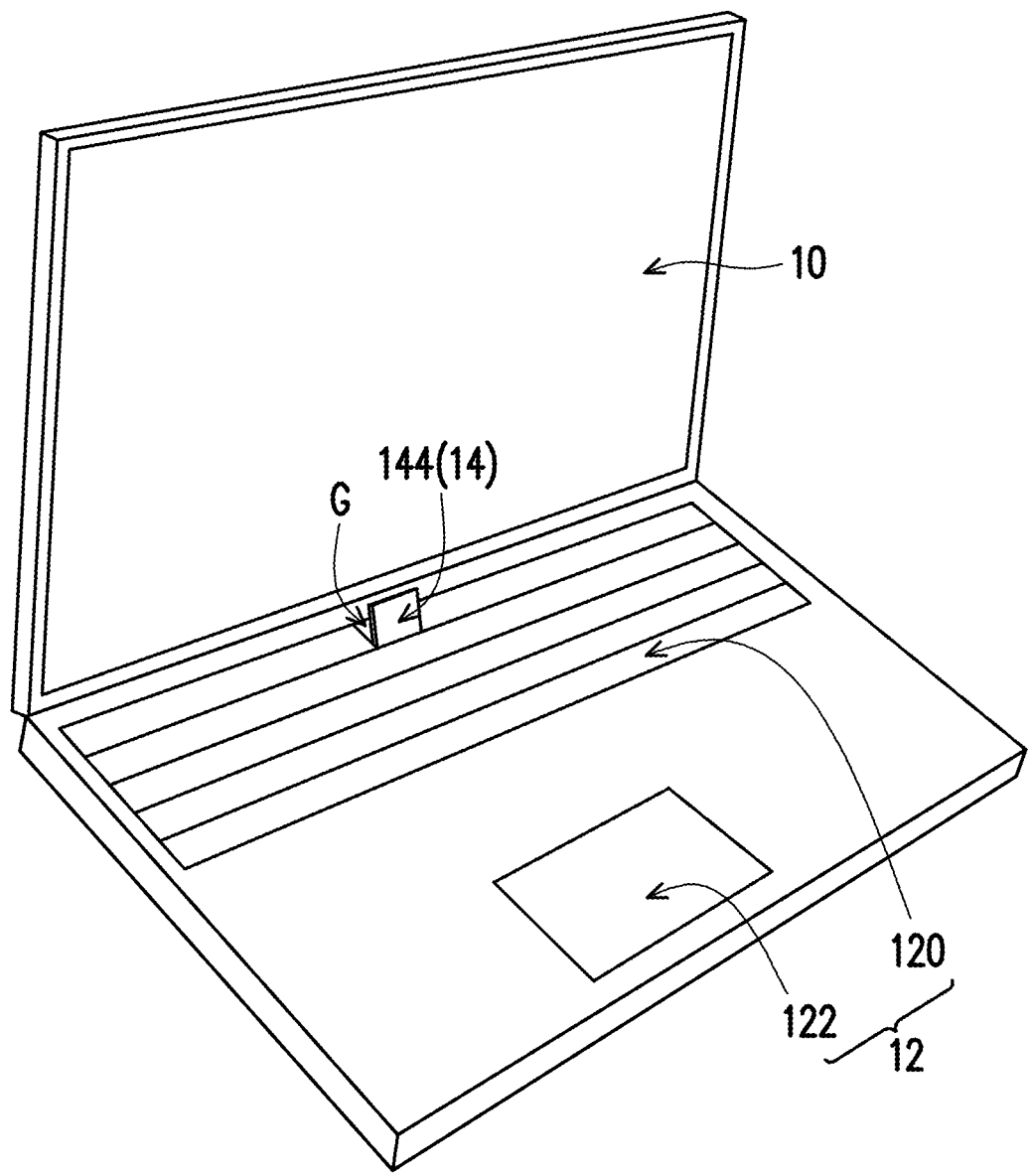
Figure 11:
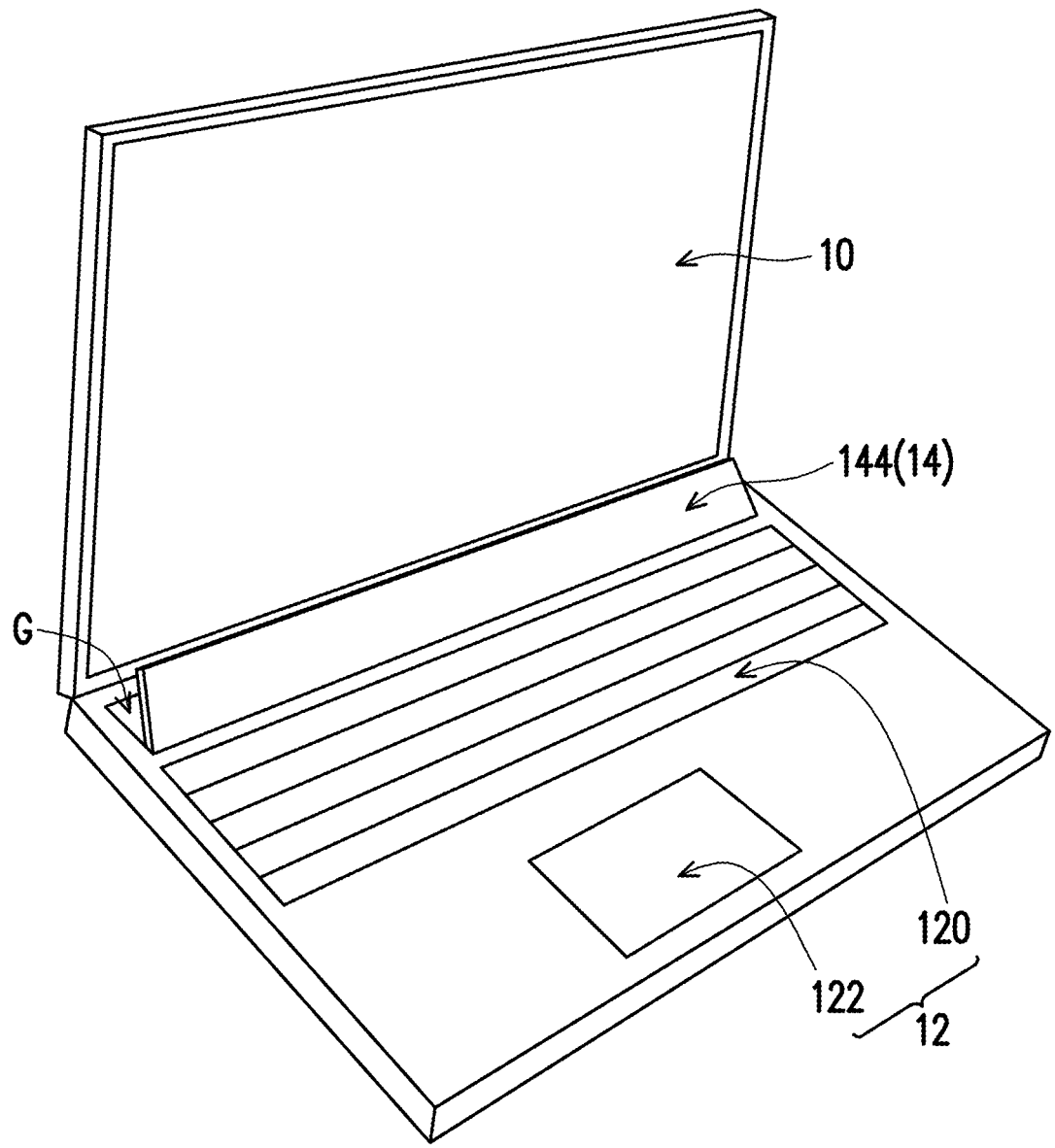

FIGS. 4A and 4B respectively are schematic cross-sectional views of a notebook computer in an open state and a closed state according to some embodiments of the invention. FIG. 5 is a schematic cross-sectional view of a portion of a notebook computer in the open state according to some embodiments of the invention. FIG. 6 is a schematic view of a light path, illustrating that image light from the user is transmitted to a photosensitive element through secondary reflection. FIGS. 7 and 8 are two schematic exploded views, respectively illustrating two polarization direction combinations of a first polarizer and a second polarizer. FIGS. 9 to 11 respectively are side schematic views of notebook computers in the open state according to some embodiments of the invention.

Referring to FIGS. 4A and 4B, a notebook computer 1 may include a screen 10, a body 12, and a camera module 14. The body 12 is pivotally connected to the screen 10, so that the screen 10 may be opened and closed relative to the body 12. The camera module 14 is stored in one of the screen 10 and the body 12 and includes a photosensitive element 140 and a first polarizer 142. The first polarizer 142 is disposed between the screen 10 and the photosensitive element 140. The screen 10 includes a display panel 100 and a second polarizer 102. The second polarizer 102 is disposed between the display panel 100 and the first polarizer 142. The first polarizer 142 and the second polarizer 102 have different polarization directions.

Specifically, in the screen 10, the display panel 100 may be a self-luminous display panel or a non-self-luminous display panel. The self-luminous display panel may include a light-emitting diode display panel, an organic light-emitting diode display panel, or a micro light-emitting diode display panel, but is not limited thereto. The non-self-luminous display panel may include a liquid crystal display panel, but is not limited thereto.

In a configuration where the display panel 100 is a non-self-luminous display panel, the screen 10 may further include a backlight module (not shown). The liquid crystal display panel is located between the backlight module and the second polarizer 102; that is, the liquid crystal display panel is disposed on the light exit side of the backlight module to receive the illuminating light provided by the backlight module, and turns the illuminating light into image light with display information (such as text information or pictures). The backlight module may include a direct-type backlight module, a side-type backlight module or any light source module that may provide a surface light source.

The second polarizer 102 is disposed on the light exit side of the display panel 100, so that the image light emitted from the screen 10 has the same polarization direction as the second polarizer 102. For example, the second polarizer 102 may be a linear polarizing plate or a circular polarizing plate, and the disclosure is not limited thereto.

In some embodiments, although not shown, the screen 10 may further include another polarizer. Said another polarizer may be disposed on the light incident side of the display panel 100. In other words, the display panel 100 is disposed between said another polarizer and the second polarizer 102.

Said another polarizer and the second polarizer 102 may have different polarization directions. Taking the linear polarizing plate as an example, as shown in FIG. 7, the polarization directions of the second polarizer 102 and said another polarizer (not shown) may respectively be parallel to a first direction D1 and a second direction D2. For example, the first direction D1 and the second direction D2 are perpendicular to each other. For example, the first direction D1 may be the horizontal direction of the display panel 100, and the second direction D2 may be the vertical direction of the display panel 100, but the disclosure is not limited thereto. In other embodiments, the first direction D1 may be the vertical direction of the display panel 100, and the second direction D2 may be the horizontal direction of the display panel 100. Alternatively, the first direction D1 may be at an angle with the horizontal direction of the display panel 100, and the second direction D2 may be at another angle with the horizontal direction of the display panel 100.

The difference between the two angles is, for example, 90 degrees, but is not limited thereto.

Taking the circular polarizing plate as an example, as shown in FIG. 8, the second polarizer 102 and said another polarizer (not shown) may be a left-hand polarizing plate and a right-hand polarizing plate, respectively, but are not limited thereto. In other embodiments not shown, the second polarizer 102 and said another polarizer (not shown) may respectively be a right-hand polarizing plate and a left-hand polarizing plate.

Referring to FIGS. 4A and 4B again, the screen 10 may be pivotally connected to the body 12 through a hinge R1 or other known mechanisms, so that the screen 10 may rotate relative to the body 12, and may switch between the open state (FIG. 4A) and the closed state (FIG. 4B).

Referring to FIGS. 9 to 11, the body 12 may include a keyboard 120 and a touchpad 122, but is not limited thereto. According to different needs, the body 12 may further include other elements or layers. For example, although not shown, the body 12 may further include an identity recognition module, such as a fingerprint recognition module, but is not limited thereto.

Referring to FIGS. 4A, 4B, and 9 to 11, the camera module 14 may be stored in the body 12 and disposed adjacent to the screen 10. Specifically, the body 12 may have a groove G for accommodating the camera module 14. As shown in FIG. 9, the groove G may be located in a partial area between the keyboard 120 and the screen 10; or, as shown in FIG. 10, the groove G may be located in the key area of keyboard 120; alternatively, as shown in FIG. 11, the groove G may be located in the entire area between the keyboard 120 and the screen 10.

In the camera module 14, the photosensitive element 140 is adapted for extracting external image light. For example, the photosensitive element 140 may include a charge coupled device (CCD) sensor or a complementary metal oxide semiconductor (CMOS) sensor, but is not limited thereto.

The first polarizer 142 is disposed upstream/above the photosensitive element 140. The first polarizer 142 allows light with the same polarization direction to pass through and filters light with a different polarization direction. The light that has passed through the first polarizer 142 continue to pass to the photosensitive element 140 and is received by the photosensitive element 140.

The first polarizer 142 may be a linear polarizing plate or a circular polarizing plate, and the first polarizer 142 and the second polarizer 102 have different polarization directions. Taking the linear polarizing plate as an example, as shown in FIG. 7, the polarization directions of the second polarizer 102 and the first polarizer 142 may respectively be parallel to the first direction D1 and the second direction D2, but are not limited thereto. Taking the circular polarizing plate as an example, as shown in FIG. 8, the second polarizer 102 and the first polarizer 142 may respectively be a left-hand polarizing plate and a right-hand polarizing plate, but are not limited thereto. In other embodiments not shown, the second polarizer 102 and the first polarizer 142 may respectively be a right-hand polarizing plate and a left-hand polarizing plate.

Referring to 4A and 4B again, when the camera module 14 is in any one of the non-work state (such as the video function not being activated) and the work state (such as the video function being activated), the photosensitive element 140 and the first polarizer 142 may both be stored in the body 12, and the first polarizer 142 is, for example, disposed horizontally in the body 12, (for example, compared to the top surface of the body 12, the first polarizer 142 is disposed horizontally; that is, the first polarizer 142 is parallel to the top surface of the body 12), but is not limited thereto.

In addition to the photosensitive element 140 and the first polarizer 142, the camera module 14 may further include a light-reflecting element 144. The first polarizer 142 is disposed between the light-reflecting element 144 and the photosensitive element 140. The light-reflecting element 144 may include a reflector or any other element that may reflect light.

The light-reflecting element 144 is pivotally connected to the body 12. For example, the light-reflecting element 144 may be pivotally connected to the body 12 through a hinge R2 or other known mechanisms, so that the light-reflecting element 144 may rotate relative to the body 12, and may switch between a horizontal state (FIG. 4B) and an inclined state (FIG. 4A). For example, when the camera module 14 is switched from the non-work state to the work state, the light-reflecting element 144 is switched from the horizontal state to the inclined state.

When the light-reflecting element 144 is in the inclined state, the light-reflecting element 144 faces the screen 10 to reflect light from the screen 10, so that the light is turned and passed toward the first polarizer 142 and the photosensitive element 140. The light from the screen 10 may include the an image light B2 emitted from the screen 10 (referring to FIG. 7 or FIG. 8) and an image light B1 from the user reflected by the screen 10 (referring to FIG. 6). In this document, the image light B2 emitted from screen 10 refers to light with display information (such as text or pictures). For a clear description, the image light from the user is called first image light, and the image light emitted by the screen is called second image light.

Referring to FIG. 6 first, the image light B1 (the first image light) from the user includes unpolarized light in various polarization directions. The first image light is transmitted to the first polarizer 142 after being reflected by the screen 10 and the light-reflecting element 144 in sequence. In the first image light, the image light whose polarization direction is different from that of the first polarizer 142 is filtered by the first polarizer 142. The image light with the same polarization direction as the first polarizer 142 in the first image light passes through/penetrates the first polarizer 142 and is received by the photosensitive element 140. On the other hand, referring to FIG. 7 or FIG. 8, the image light B2 (the second image light) emitted from the screen 10 has the same polarization direction as the second polarizer 102. Through the design of the first polarizer 142 and the second polarizer 102 having different polarization directions, the second image light transmitted to the photosensitive element 140 is filtered by the first polarizer 142. Therefore, the probability of the photosensitive element 140 receiving the second image light may be reduced; that is, the interference of the second image light on the imaging quality may be reduced, so that the photosensitive element 140 may obtain a clear user image (the image formed by the first image light).

Since the user's face faces the screen 10 during a video call, through light-reflecting elements (such as the screen 10 and the light-reflecting element 144) such as a screen, the image light (the first image light) from the user is reflected to the photosensitive element 140, so that problems of poor shooting angles such as the shift of the line of sight or shooting the nostrils and the chin or the fingers may be avoided. In addition, through the first polarizer 142 disposed between the screen 10 and the photosensitive element 140 filtering the image light emitted from the screen 10, the photosensitive element 140 may obtain a clear user image, and may further achieve at least one of the following effects: enhancing the vividness of colors, and reducing or eliminating reflections (such as reflections of hand-held objects or reflections of glasses, etc.).

The smooth surface of the screen 10 may reflect the image light (first image light) from the user. In some embodiments, the surface roughness of the screen 10 may be less than or equal to 0.012Ra. In some embodiments, the reflectance of the screen 10 in the visible light band (for example, the wavelength falls within the range of 360 nm to 830 nm) is greater than or equal to 2% and less than or equal to 75%, and preferably 70%, 60%, 50%, 40% or 30%, etc. In some embodiments, the absorption coefficient (K value) of the screen 10 in the visible light band is preferably close to zero.

Disposing the camera module 14 in the body 12 facilitates reducing the width of the upper border of the screen 10, thereby increasing the screen ratio. In addition, when a video call is to be conducted, the light-reflecting element 144 may be switched from the horizontal state to the inclined state. The light-reflecting element 144 may shield the photosensitive element 140 when the camera module 14 is in the non-work state, which facilitates protection of privacy and/or protection of the photosensitive element 140 (for example, reducing the probability of the photosensitive element 140 being scratched).

In some embodiments, for example, when the dimension of the notebook computer 1 is 13 inches to 17 inches, when the light-reflecting element 144 is in the inclined state, as shown in FIG. 4A, a distance Y1 (for example, the distance between the bottom edge of the display area R10 and the middle of the photosensitive element 140 in a third direction D3) between a display area R10 of the screen 10 and the photosensitive element 140 is between 9 mm and 45 mm, and is preferably between 19 mm and 21 mm; a distance Y2 (for example, the distance between the bottom edge of the display area R10 and the hinge R2 in the third direction D3) between the display area R10 of the screen 10 and the light-reflecting element 144 is between 9 mm and 50 mm, and is preferably between 19 mm and 21 mm; a height Z (for example, the distance between the top surface of the body 12 and the highest point of the light-reflecting element 144 on a normal direction Dn of the body 12) of the light-reflecting element 144 is between 2 mm and 50 mm, and is preferably 7.3 mm; an included angle θ1 between the screen 10 and the body 12 is, for example, between 0 degrees and 135 degrees, and is preferably between 100 degrees and 110 degrees; an included angle θ2 between the light-reflecting element 144 and the first polarizer 142 is, for example, between 0 degrees and 85 degrees, and is preferably between 55 degrees and 65 degrees. Through the above design, a clear user image may be better obtained when the dimension of the notebook computer 1 is 13 inches to 17 inches.

In the above-mentioned embodiment, the photosensitive element 140 is disposed horizontally in the body 12, but is not limited thereto. In other embodiments, as shown in FIG. 5, the photosensitive element 140 may face the light-reflecting element 144, and an angle θ3 between the photosensitive element 140 and the first polarizer 142 may be between 20 degrees and 45 degrees (that is, 20°<θ3<45°), and preferably between 25 degrees and 35 degrees.

Figure 12A:
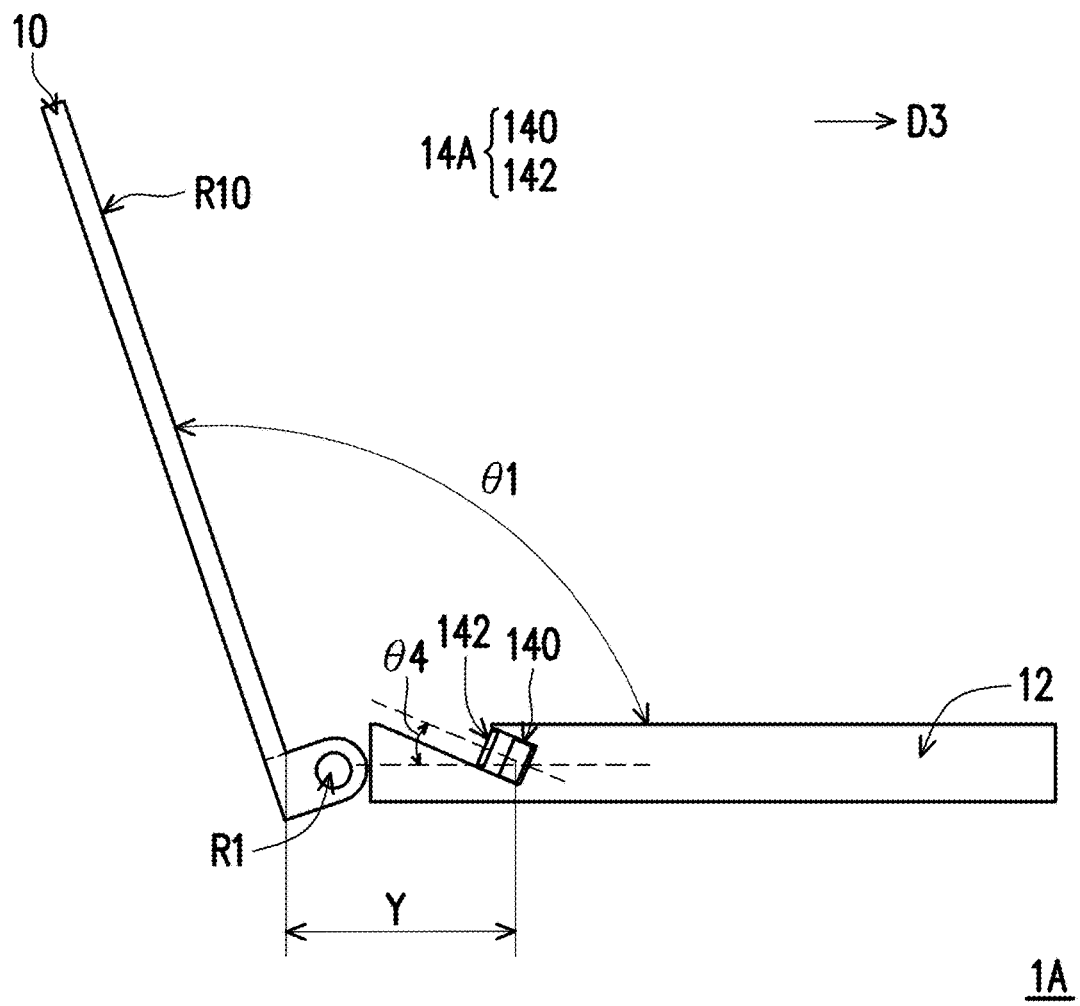
FIGS. 12A and 12B respectively are schematic cross-sectional views of a notebook computer in the open state and closed state according to some embodiments of the invention.
Figure 12B:
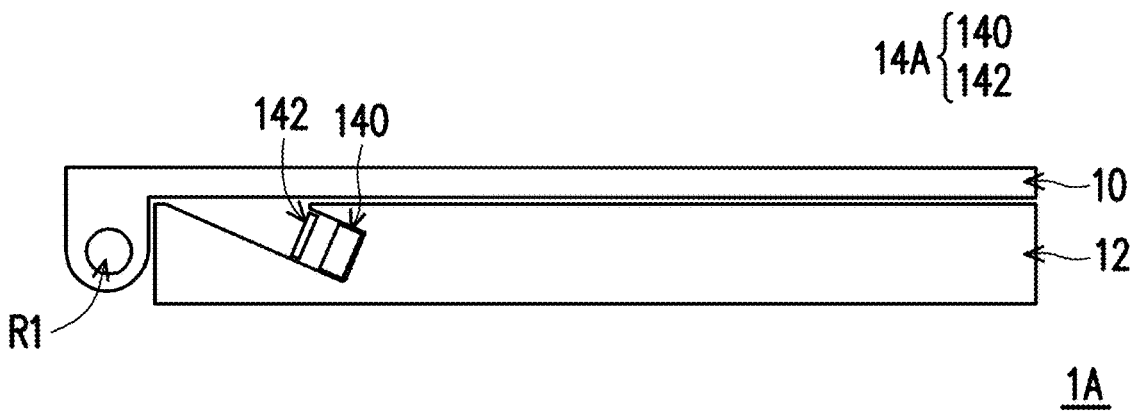
Figure 12C:
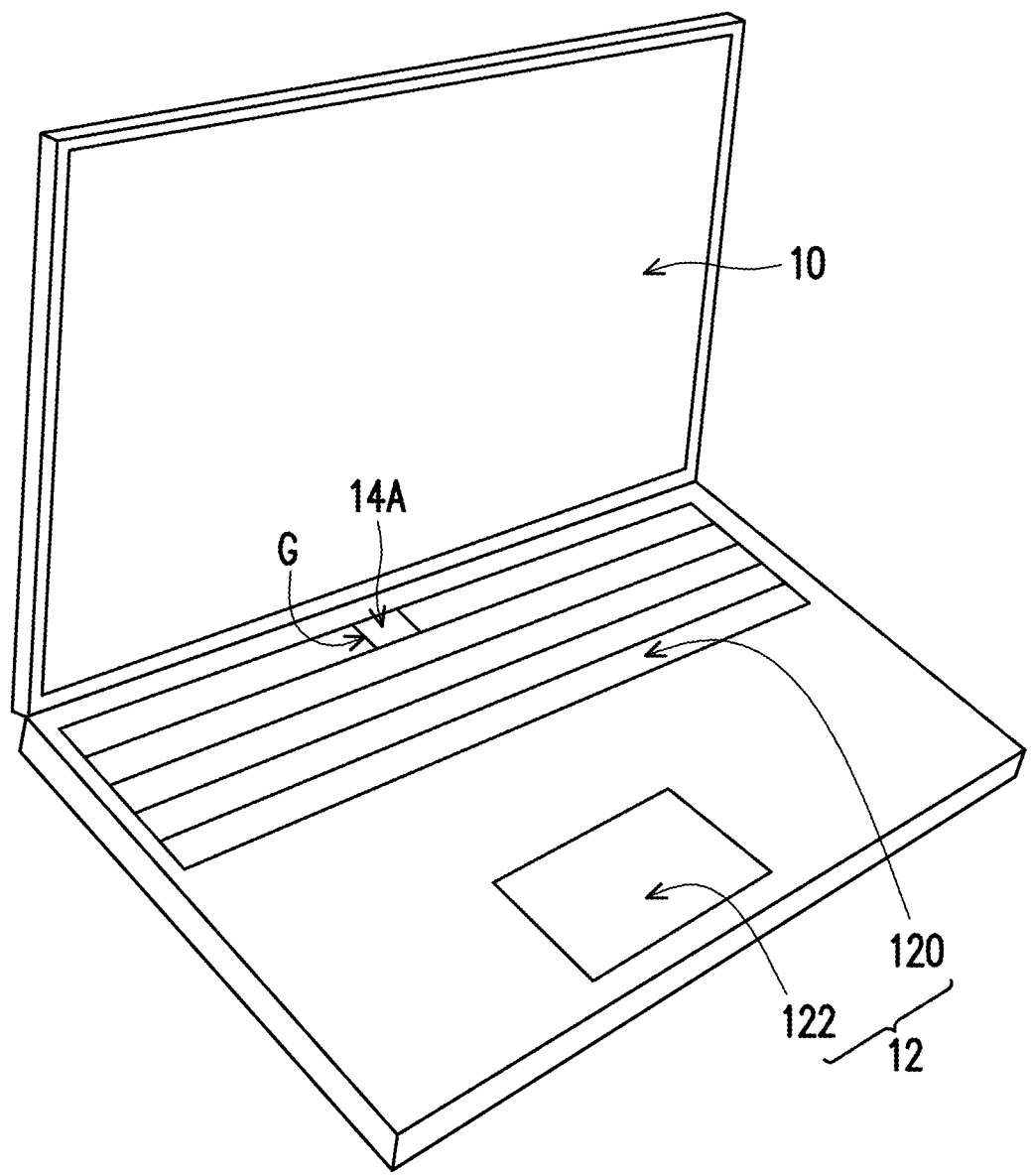
FIG. 12C is a side schematic view of a notebook computer in the open state according to some embodiments of the invention.
Figure 12D:
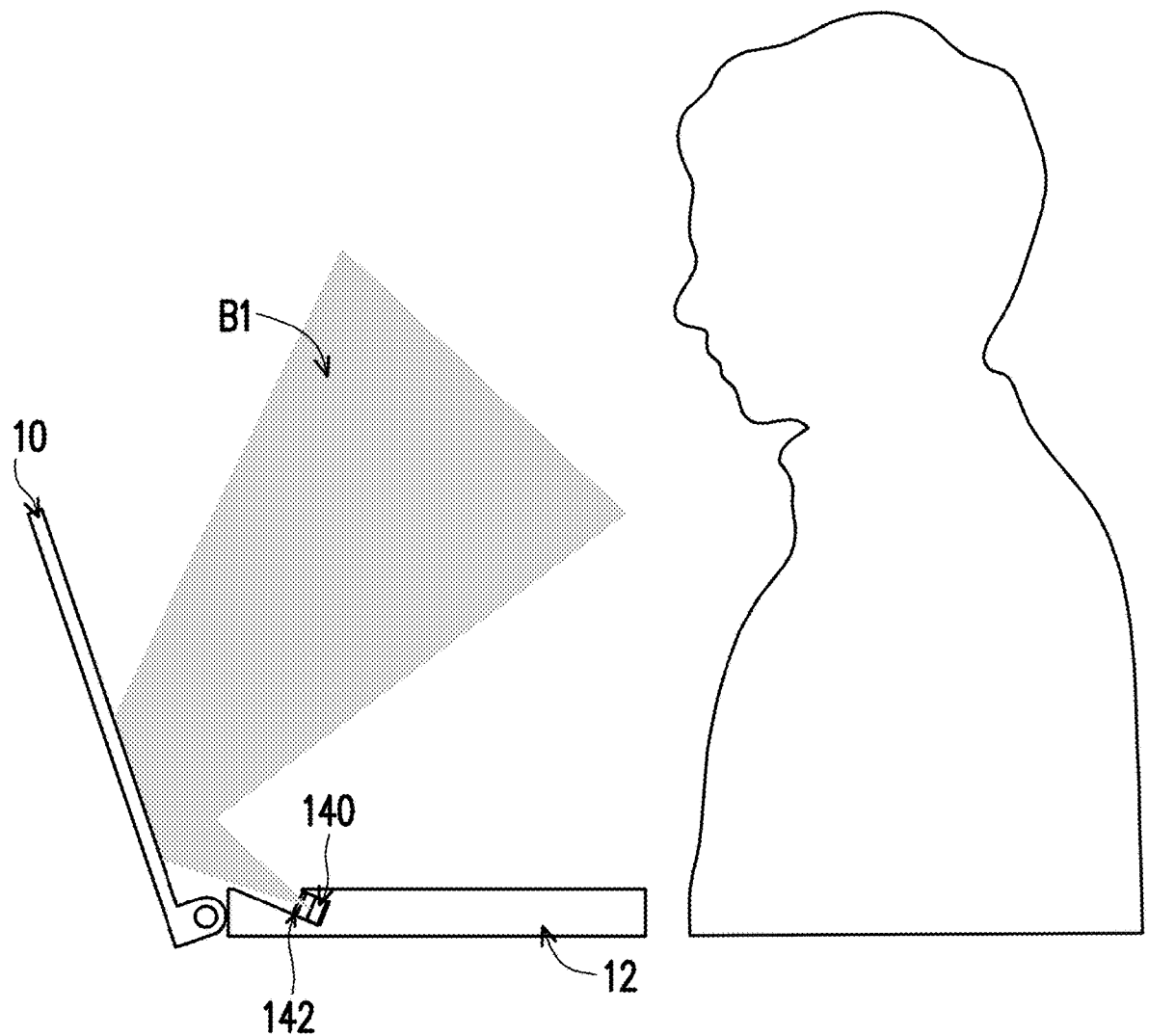
FIG. 12D is a schematic view of a light path, illustrating that the image light from the user is transmitted to the photosensitive element through a single reflection.

FIGS. 12A and 12B respectively are schematic cross-sectional views of a notebook computer in the open state and closed state according to some embodiments of the invention. FIG. 12C is a side schematic view of a notebook computer in the open state according to some embodiments of the invention. FIG. 12D is a schematic view of a light path, illustrating that the image light from the user is transmitted to the photosensitive element through a single reflection.

Referring to FIGS. 12A to 12D, the main differences between a notebook computer 1A and the aforementioned notebook computer 1 are explained as follows.

In the notebook computer 1A, a camera module 14A includes the photosensitive element 140 and the first polarizer 142 and does not include the above-mentioned light-reflecting element 144 (referring to FIG. 4A). When the camera module 14A is in any one of the non-work state (e.g., the video function not being activated) and the work state (e.g., the video function being activated), the photosensitive element 140 and the first polarizer 142 are placed in an inclined manner in the body 12 (for example, compared to the top surface of the body 12, the photosensitive element 140 and the first polarizer 142 are disposed in an inclined manner, that is, the photosensitive element 140 and the first polarizer 142 are not perpendicular nor parallel to the top surface of the body 12), and the photosensitive element 140 and the first polarizer 142 may have the same inclination angle.

The photosensitive element 140 faces the screen 10 to receive the image light B1 (the first image light) from the user that is reflected by the screen 10. Specifically, in a configuration where the light-reflecting element 144 (referring to FIG. 4A) is omitted, the image light B1 (the first image light) from the user is transmitted to the first polarizer 142 after being reflected by the screen 10. In the first image light, the image light whose polarization direction is different from that of the first polarizer 142 is filtered by the first polarizer 142. The image light with the same polarization direction as the first polarizer 142 in the first image light passes through/penetrates the first polarizer 142 and is received by the photosensitive element 140.

In some embodiments, for example, when the dimension of the notebook computer 1A is 13 inches to 17 inches, as shown in FIG. 12A, a distance Y (for example, the distance between the bottom edge of the display area R10 and the photosensitive element 140 in the third direction D3) between the display area R10 of the screen 10 and the photosensitive element 140 is between 9 mm and 45 mm, and is preferably 10 mm; the included angle θ1 between the screen 10 and the body 12 is, for example, between 0 degrees and 135 degrees, and preferably 110 degrees; an inclination angle θ4 (for example, the angle between the normal vector of the first polarizer 142 and the top surface of the body 12) of the first polarizer 142 is, for example, between 5 degrees and 85 degrees, and preferably between 20 degrees and 25 degrees. Through the above design, a clear user image may be better obtained when the dimension of the notebook computer 1A is 13 inches to 17 inches.

Figure 13A:
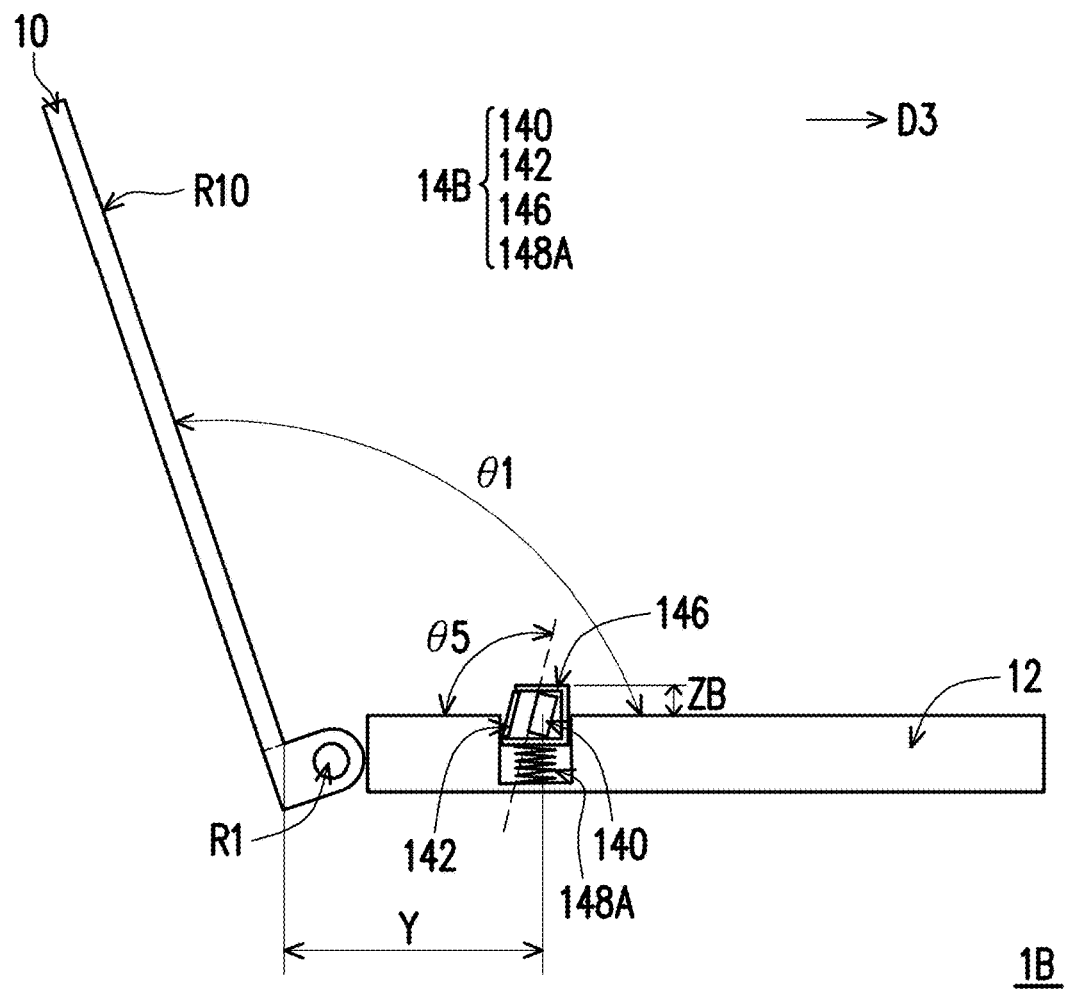
FIGS. 13A and 13B respectively are schematic cross-sectional views of a notebook computer in the open state and closed state according to some embodiments of the invention.
Figure 13B:
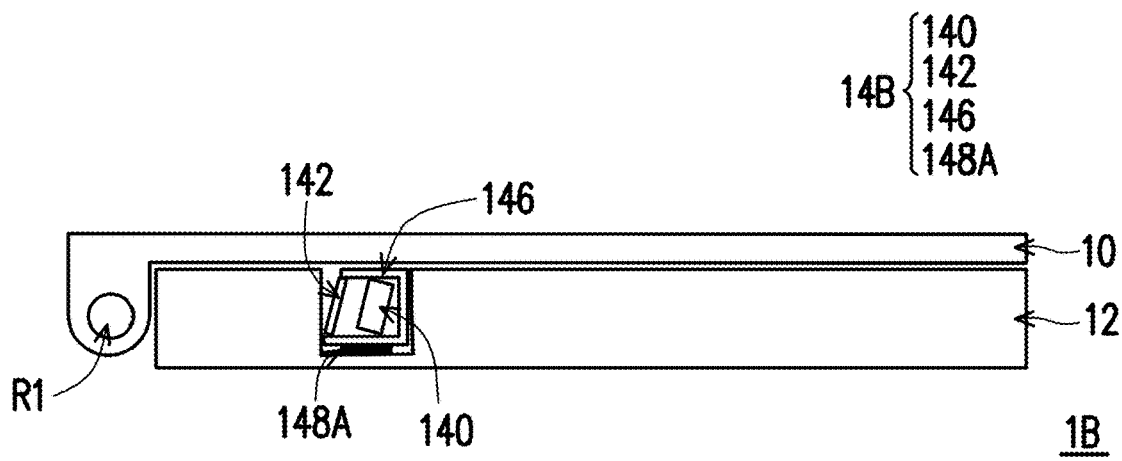
Figure 13C:
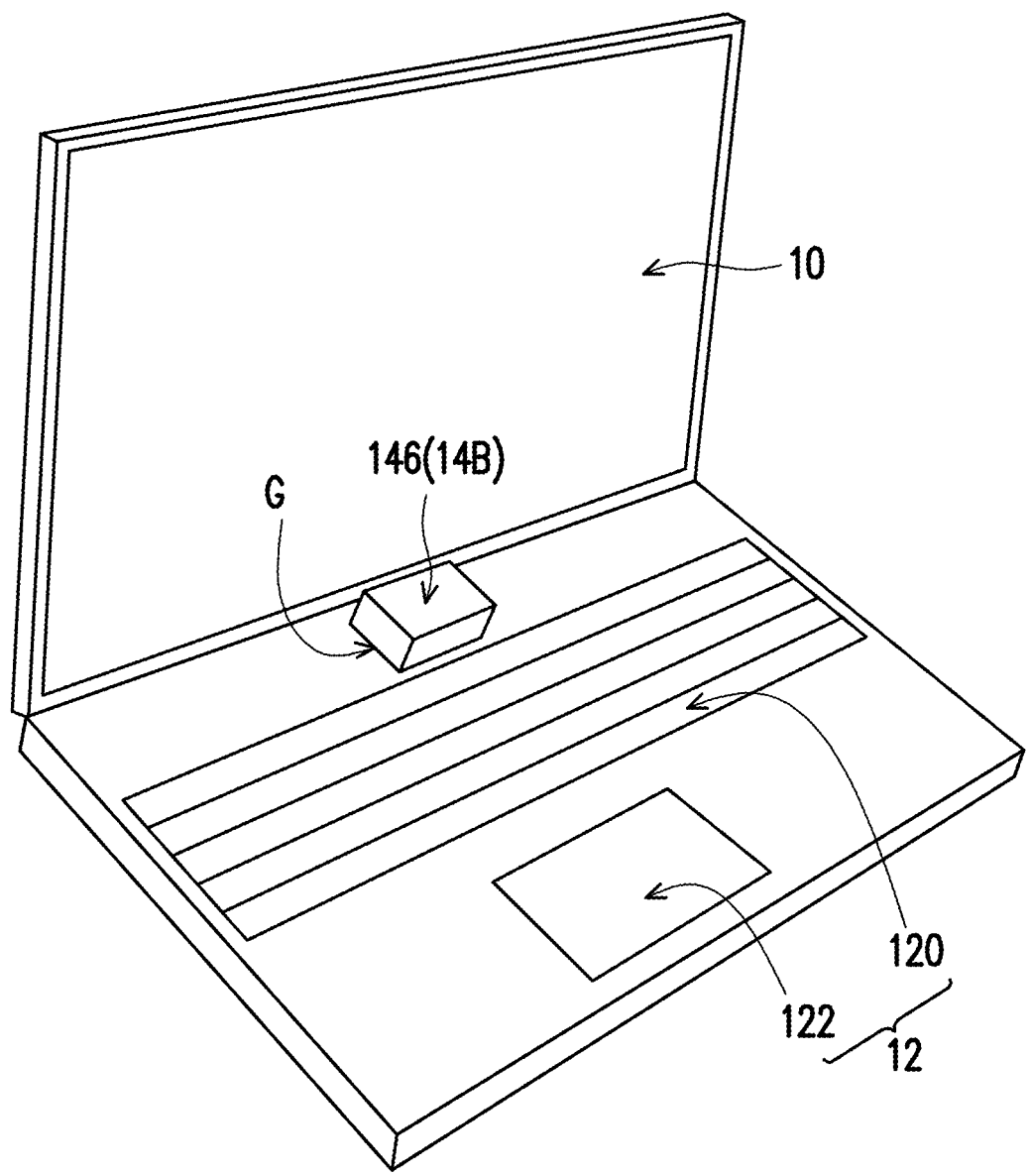
FIG. 13C is a side schematic view of a notebook computer in the open state according to some embodiments of the invention.
Figure 13D:
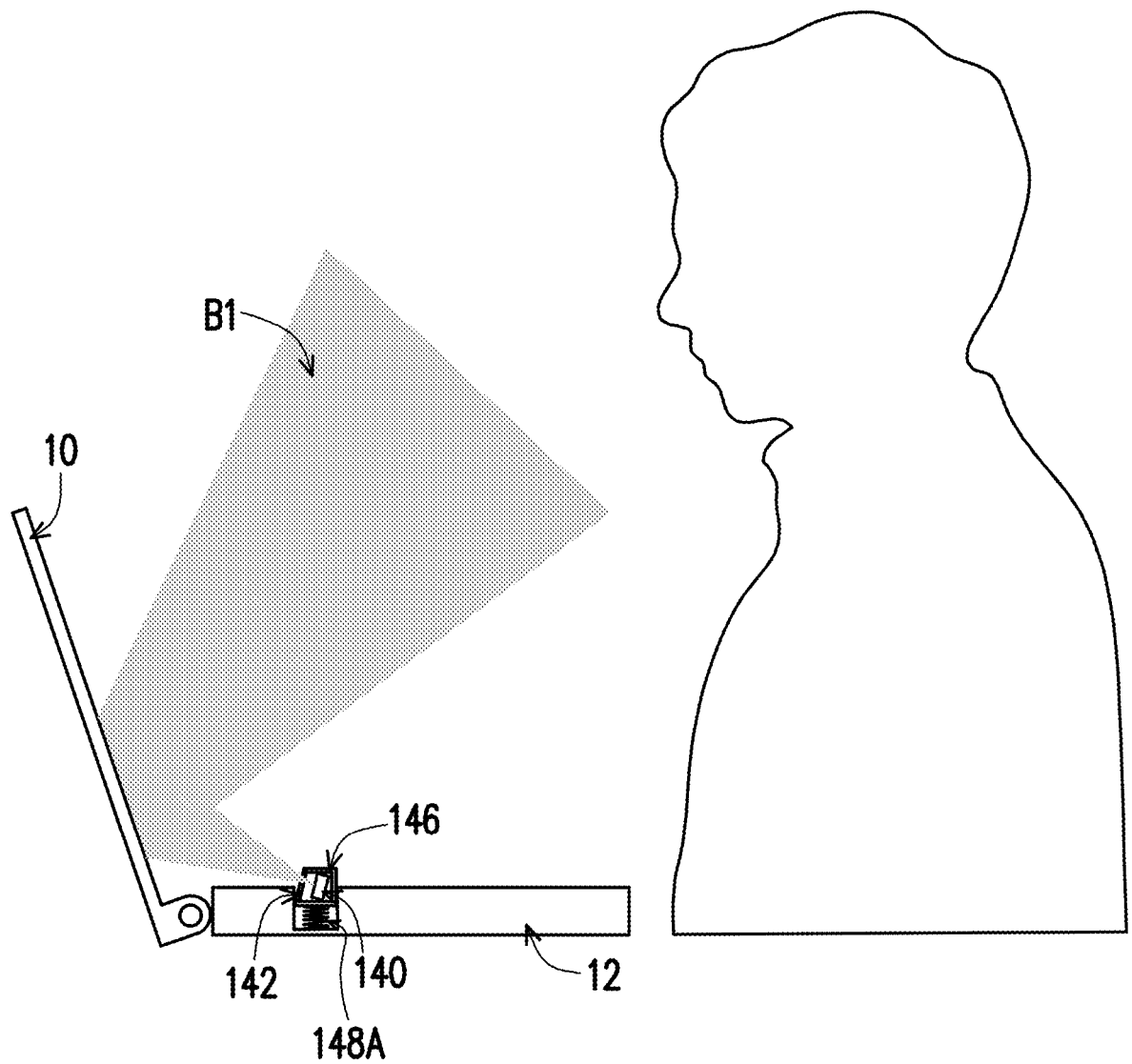
FIG. 13D is a schematic view of a light path, illustrating that the image light from the user is transmitted to the photosensitive element through a single reflection.
Figure 14A:
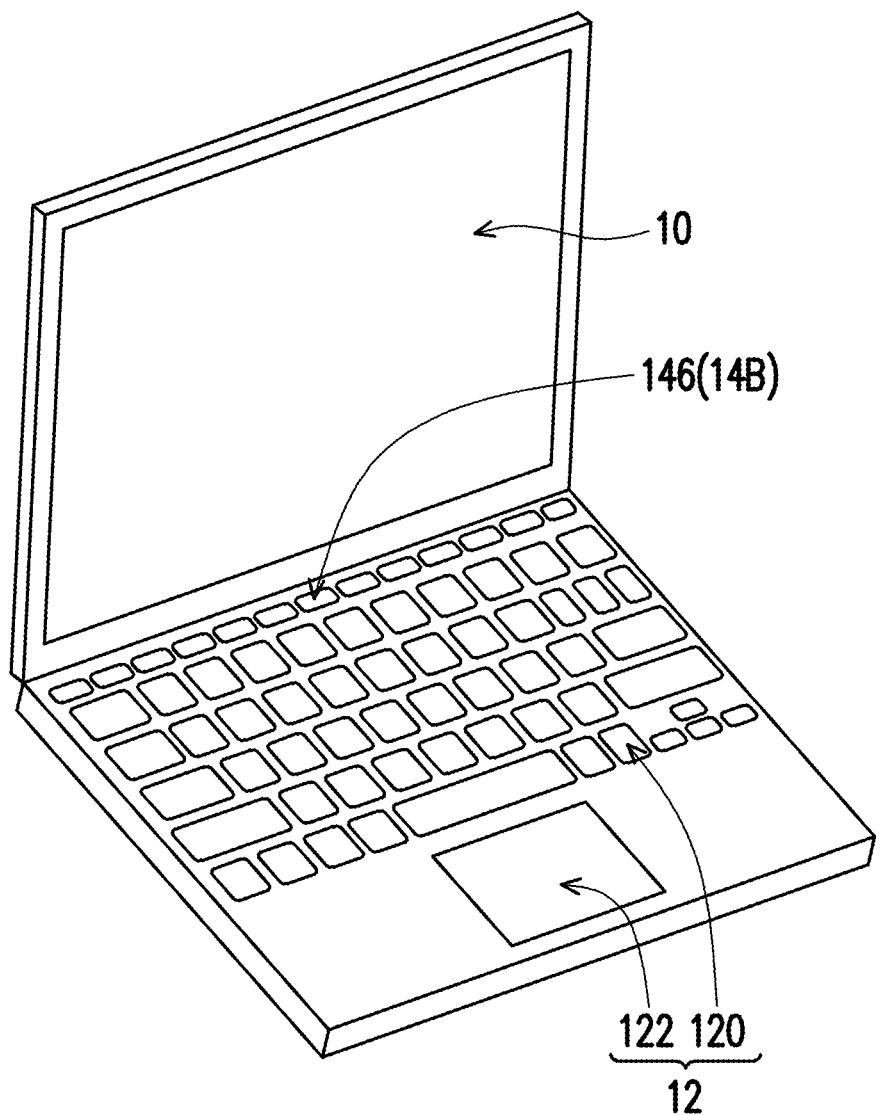
FIGS. 14A and 14B respectively are side schematic views of a notebook computer in the open state according to some embodiments of the invention, respectively illustrating that the camera module is in a non-work state and a work state.
Figure 14B:
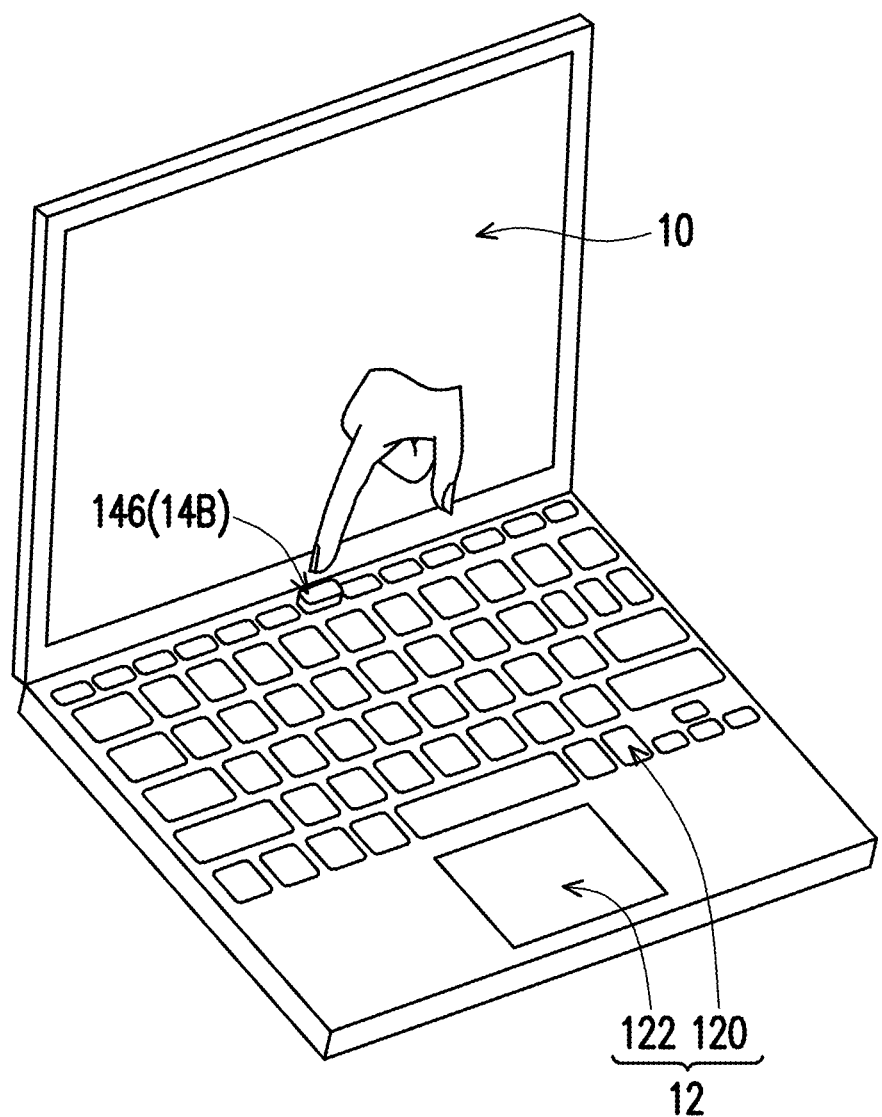
Figure 15:
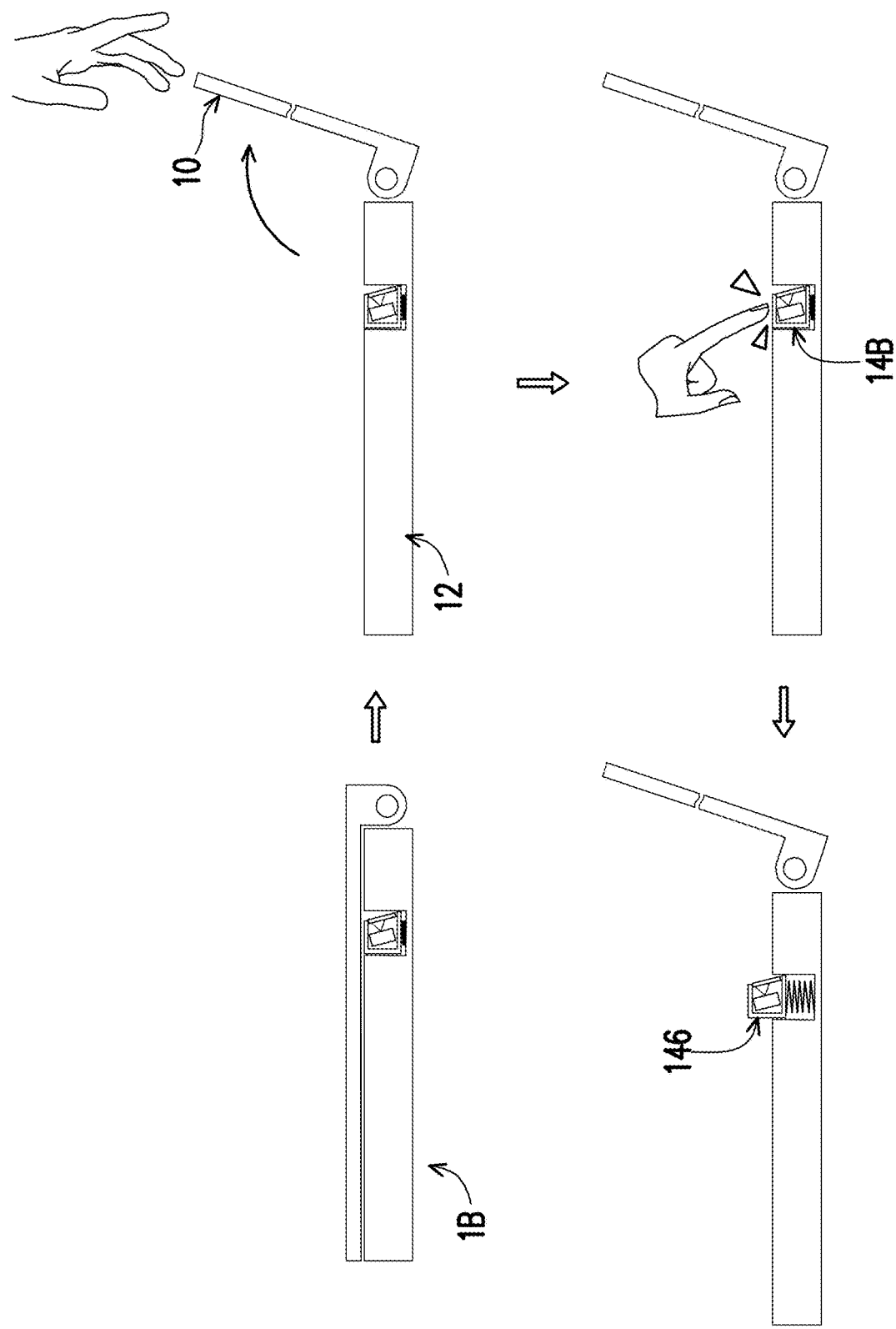
FIG. 15 is a schematic view of the operation of a notebook computer according to some embodiments of the invention.

FIGS. 13A and 13B respectively are schematic cross-sectional views of a notebook computer in the open state and closed state according to some embodiments of the invention. FIG. 13C is a side schematic view of a notebook computer in the open state according to some embodiments of the invention. FIG. 13D is a schematic view of a light path, illustrating that the image light from the user is transmitted to the photosensitive element through a single reflection. FIGS. 14A and 14B respectively are side schematic views of a notebook computer in the open state according to some embodiments of the invention, respectively illustrating that the camera module is in a non-work state and a work state. FIG. 15 is a schematic view of the operation of a notebook computer according to some embodiments of the invention.

Referring to FIGS. 13A to 13D, the main differences between a notebook computer 1B and the aforementioned notebook computer 1A are explained as follows.

In the notebook computer 1B, when a camera module 14B is in the non-work state (as shown in FIG. 13B), the photosensitive element 140 and the first polarizer 142 are both stored in the body 12, and when the camera module 14B is in the work state (as shown in FIG. 13A), both the photosensitive element 140 and the first polarizer 142 protrude from the body 12.

In addition to the photosensitive element 140 and the first polarizer 142, the camera module 14B further includes a case 146 and an elastic element 148A. The case 146 is used to store the photosensitive element 140 and the first polarizer 142. When the camera module 14B is in the non-work state, the case 146 is stored in the body 12, and when the camera module 14B is in the work state, the case 146 protrudes from the body 12. The case 146 has an opening, and the first polarizer 142 is disposed adjacent to the opening of the case 146. In some embodiments, the first polarizer 142 may be fixed at the opening of the case 146, and the photosensitive element 140 is disposed in the space enclosed by the first polarizer 142 and the case 146.

The elastic element 148A is disposed between the case 146 and the body 12. When the camera module 14B is in the work state, the elastic element 148A allows the case 146 to be raised a predetermined distance ZB, so that the photosensitive element 140 and the first polarizer 142 protrude from the body 12. For example, the elastic element 148A may include a spring, but is not limited thereto.

In some embodiments, for example, when the dimension of the notebook computer 1B is 13 inches to 17 inches, as shown in FIG. 13A, when the camera module 14B is in the work state, the distance Y (for example, the distance between the bottom edge of the display area R10 and the photosensitive element 140 in the third direction D3) between the display area R10 of the screen 10 and the photosensitive element 140 is between 9 mm and 300 mm, and is preferably 10 mm; the predetermined distance ZB is, for example, between 3 mm and 30 mm, and preferably 9 mm; the included angle θ1 between the screen 10 and the body 12 is, for example, between 90 degrees and 135 degrees, and preferably 110 degrees; an inclination angle θ5 (for example, the angle between the first polarizer 142 and the top surface of the body 12) of the first polarizer 142 is, for example, between 90 degrees and 150 degrees, and preferably between 105 degrees and 130 degrees.

In some embodiments, as shown in FIG. 13C, the groove G of the body 12 for accommodating the camera module 14B may be located in a partial area between the keyboard 120 and the screen 10, but is not limited thereto. As shown in FIGS. 14A and 14B, the camera module 14B may be combined with a function key in the keyboard 120, and the pre-force of the elastic element 148A may be released by pressing the function key with a finger, thereby driving the case 146 up to provide an ideal shooting angle.

As shown in FIG. 15, the screen 10 is rotated relative to the body 12 according to the direction indicated by the arrow, so that the notebook computer 1B is switched from the closed state to the open state. Next, the camera module 14B may be pressed to raise the camera module 14B to a predetermined distance to activate the video call function. When the user closes the screen 10 (not shown), the design of the case 146 with an oblique angle may facilitate the camera module 14B to return to the body 12. In some embodiments, although not shown, the camera module 14B may be stored back into the body 12 by pressing the camera module 14B again.

Figure 16A:
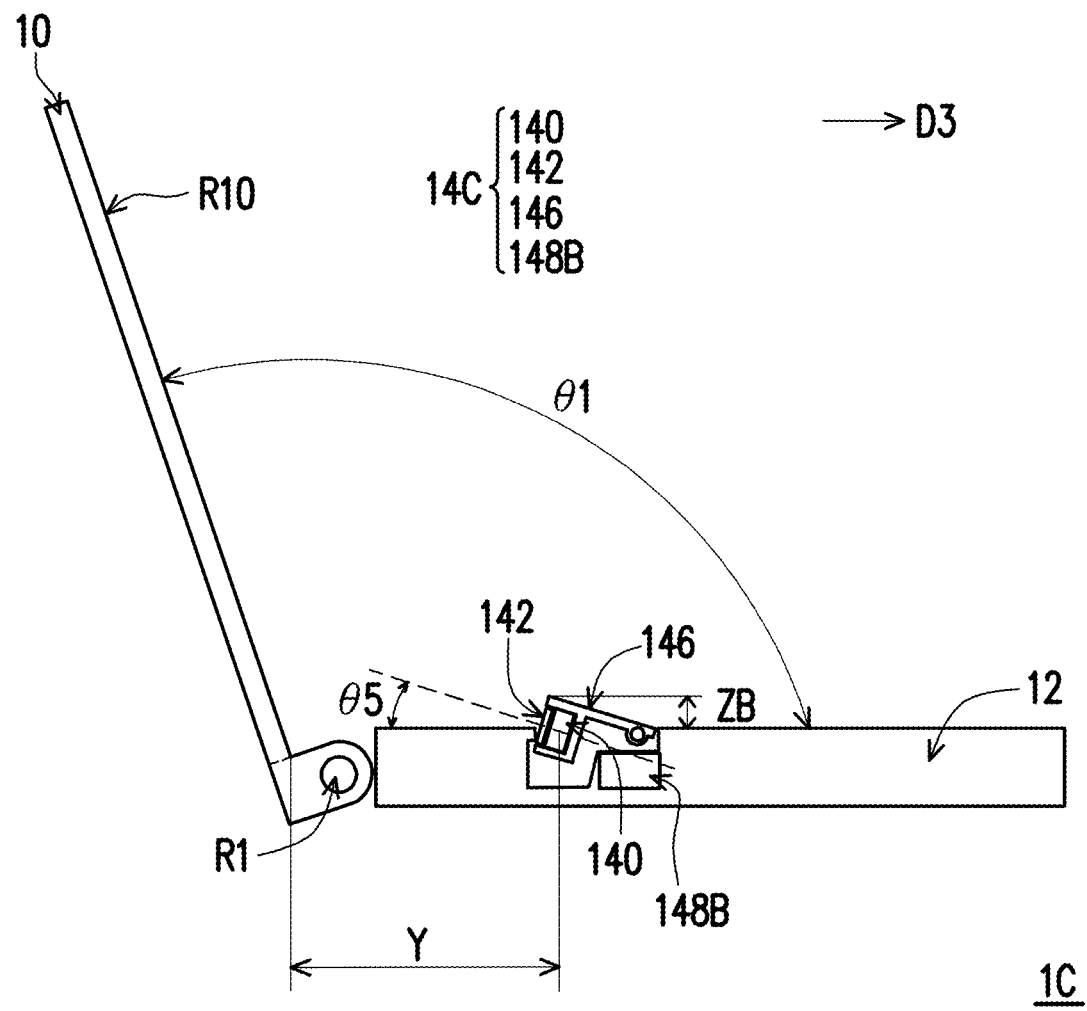
FIGS. 16A and 16B respectively are schematic cross-sectional views of a notebook computer in the open state according to some embodiments of the invention, respectively illustrating two methods of switching the camera module to the work state.
Figure 16B:
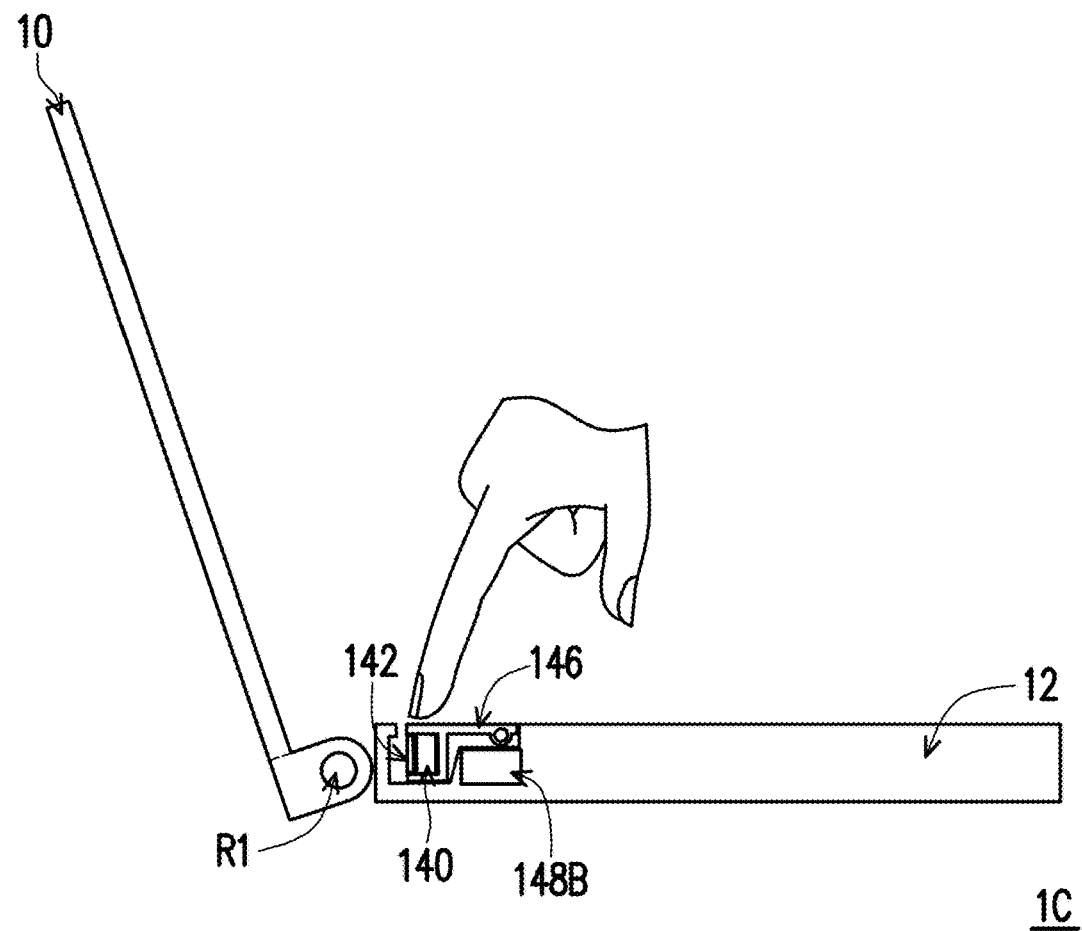
Figure 16C:
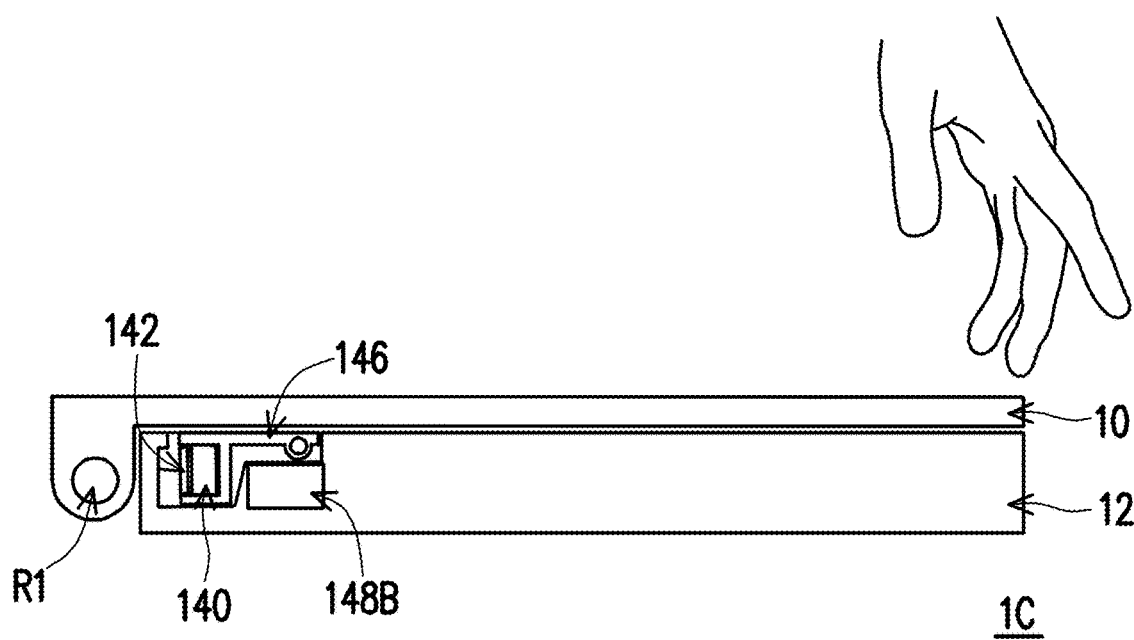
FIG. 16C is a schematic cross-sectional view of a notebook computer in the closed state according to some embodiments of the invention.
Figure 16D:
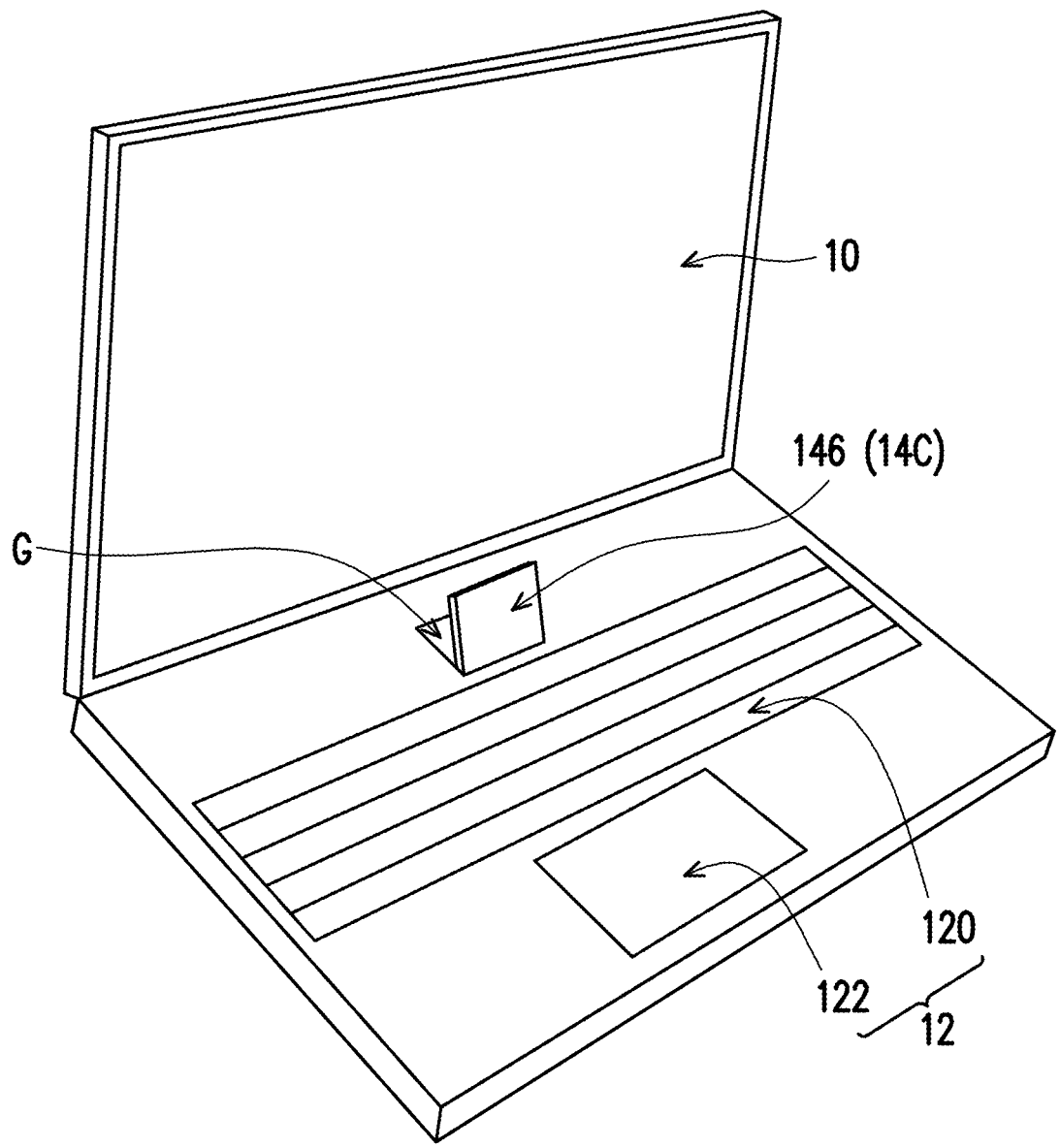
FIG. 16D is a side schematic view of a notebook computer in the open state according to some embodiments of the invention.
Figure 16E:
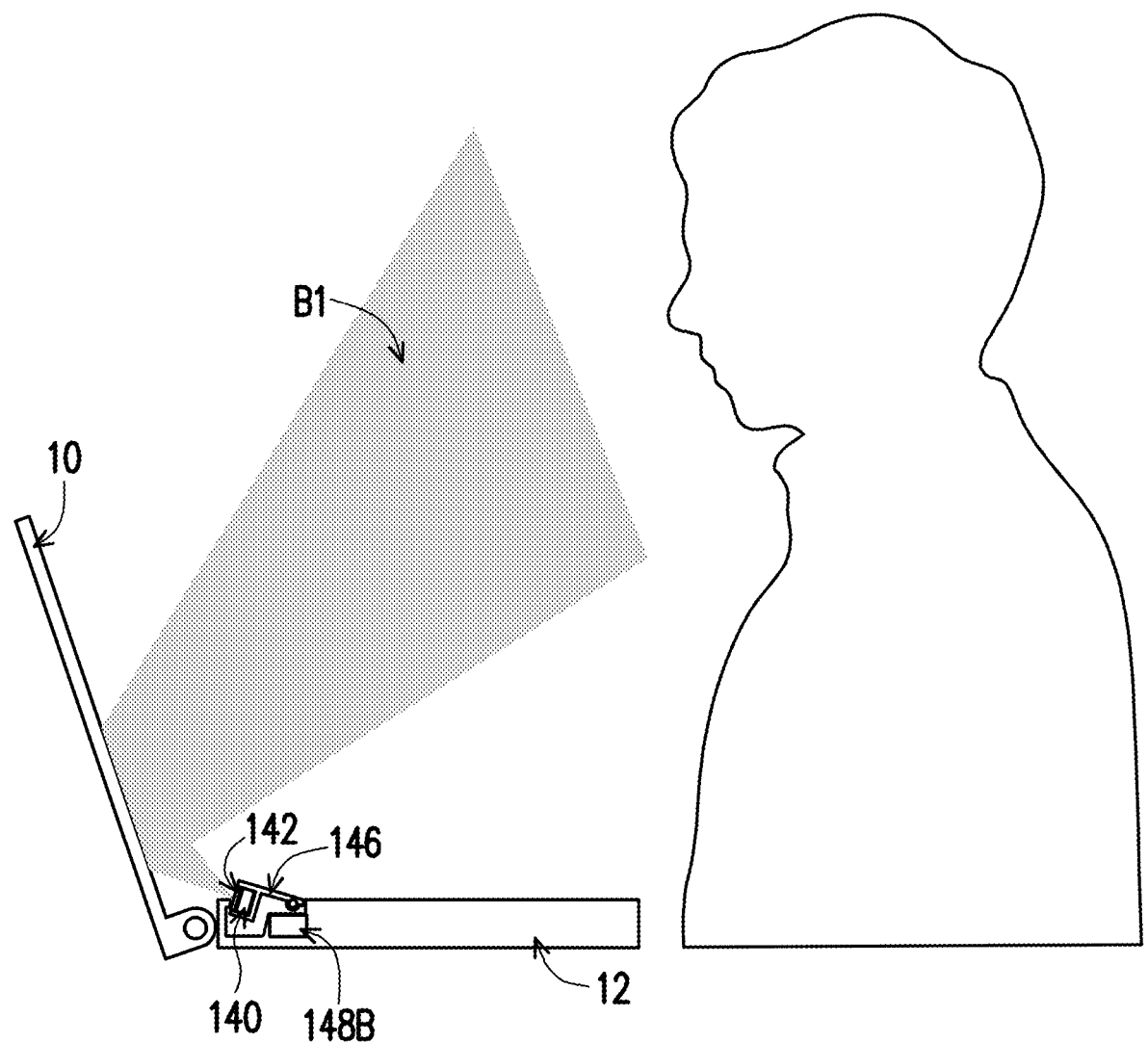
FIG. 16E is a schematic view of a light path, illustrating that the image light from the user is transmitted to the photosensitive element through a single reflection.

FIGS. 16A and 16B respectively are schematic cross-sectional views of a notebook computer in the open state according to some embodiments of the invention, respectively illustrating two methods of switching the camera module to the work state. FIG. 16C is a schematic cross-sectional view of a notebook computer in the closed state according to some embodiments of the invention. FIG. 16D is a side schematic view of a notebook computer in the open state according to some embodiments of the invention. FIG. 16E is a schematic view of a light path, illustrating that the image light from the user is transmitted to the photosensitive element through a single reflection.

Referring to FIGS. 16A to 16E, the main differences between a notebook computer 1C and the aforementioned notebook computer 1B are explained as follows.

In the notebook computer 1C, a camera module 14C includes the photosensitive element 140, the first polarizer 142, the case 146, and a power module 148B and does not include the above-mentioned elastic element 148A. The power module 148B is connected to the case 146 and controls the case 146 to be switched between the horizontal state (referring to FIG. 16B or FIG. 16C) and the inclined state (referring to FIG. 16A). When the camera module 14C is in the work state, the power module 148B allows the case 146 to be raised a predetermined distance ZC, so that the photosensitive element 140 and the first polarizer 142 protrude from the body 12. Although not shown, when the screen 10 is closed to a certain predetermined angle, the power module 148B may drive the case 146 to be stored in the body 12 to prevent the camera module 14C and the screen 10 from colliding and breaking, which provides safety and convenience. Of course, in another embodiment, before the screen 10 is closed, the case 146 may be pressed manually so that the case 146 is stored in the body 12, as shown in FIG. 16B.

In some embodiments, for example, when the dimension of the notebook computer 1C is 13 inches to 17 inches, as shown in FIG. 16A, when the camera module 14C is in work state, the distance Y (for example, the distance between the bottom edge of the display area R10 and the photosensitive element 140 in the third direction D3) between the display area R10 of the screen 10 and the photosensitive element 140 is between 9 mm and 300 mm, and is preferably 10 mm; the predetermined distance ZB is, for example, between 3 mm and 30 mm, and preferably 7 mm; the included angle θ1 between the screen 10 and the body 12 is, for example, between 90 degrees and 135 degrees, and preferably 110 degrees; the inclination angle θ5 (for example, the angle between the first polarizer 142 and the top surface of the body 12) of the first polarizer 142 is, for example, between 5 degrees and 60 degrees, and preferably between 20 degrees and 40 degrees.

Figure 17A:
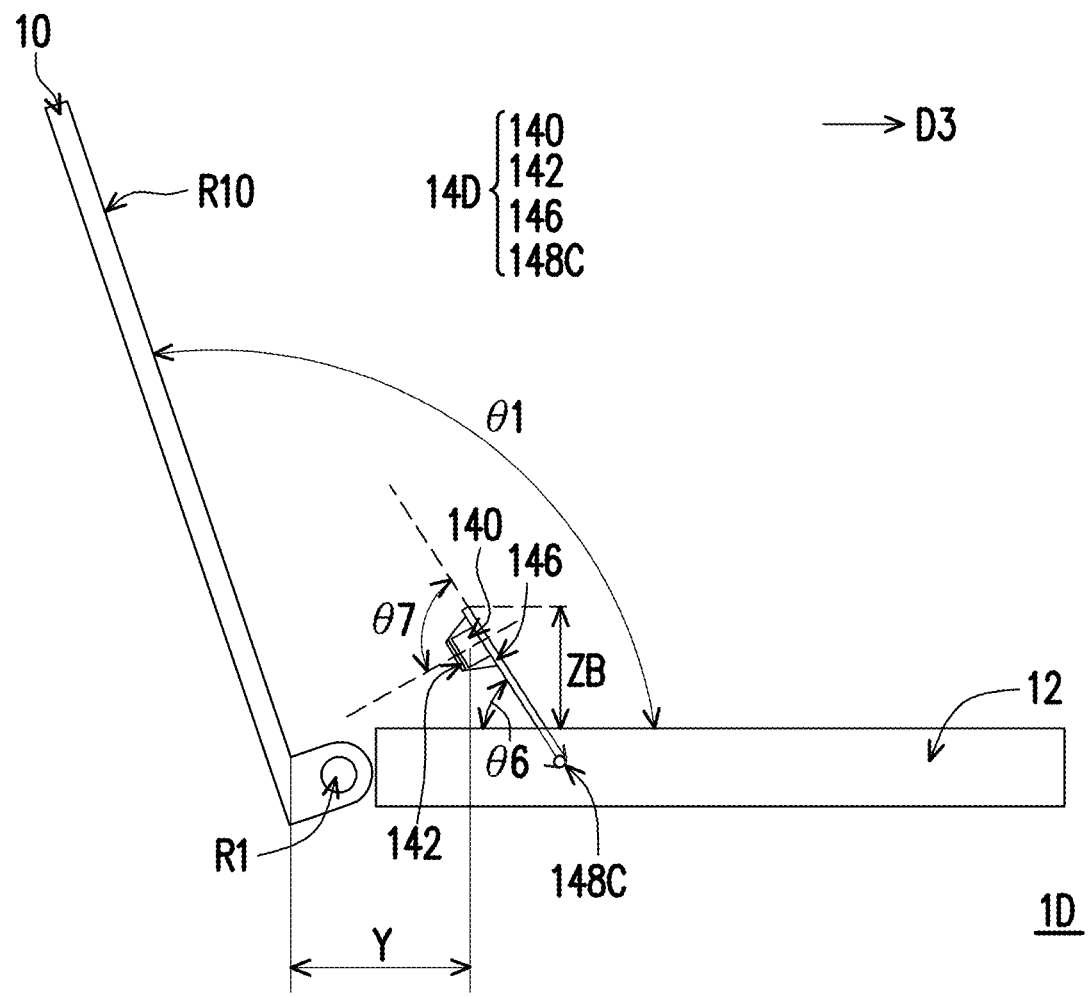
FIGS. 17A and 17B respectively are schematic cross-sectional views of a notebook computer in the open state and the closed state according to some embodiments of the invention.
Figure 17B:
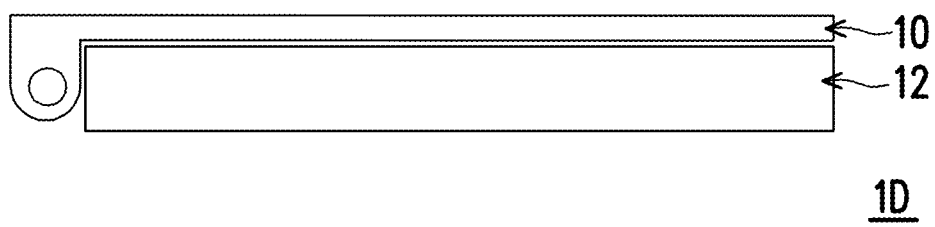
Figure 17C:
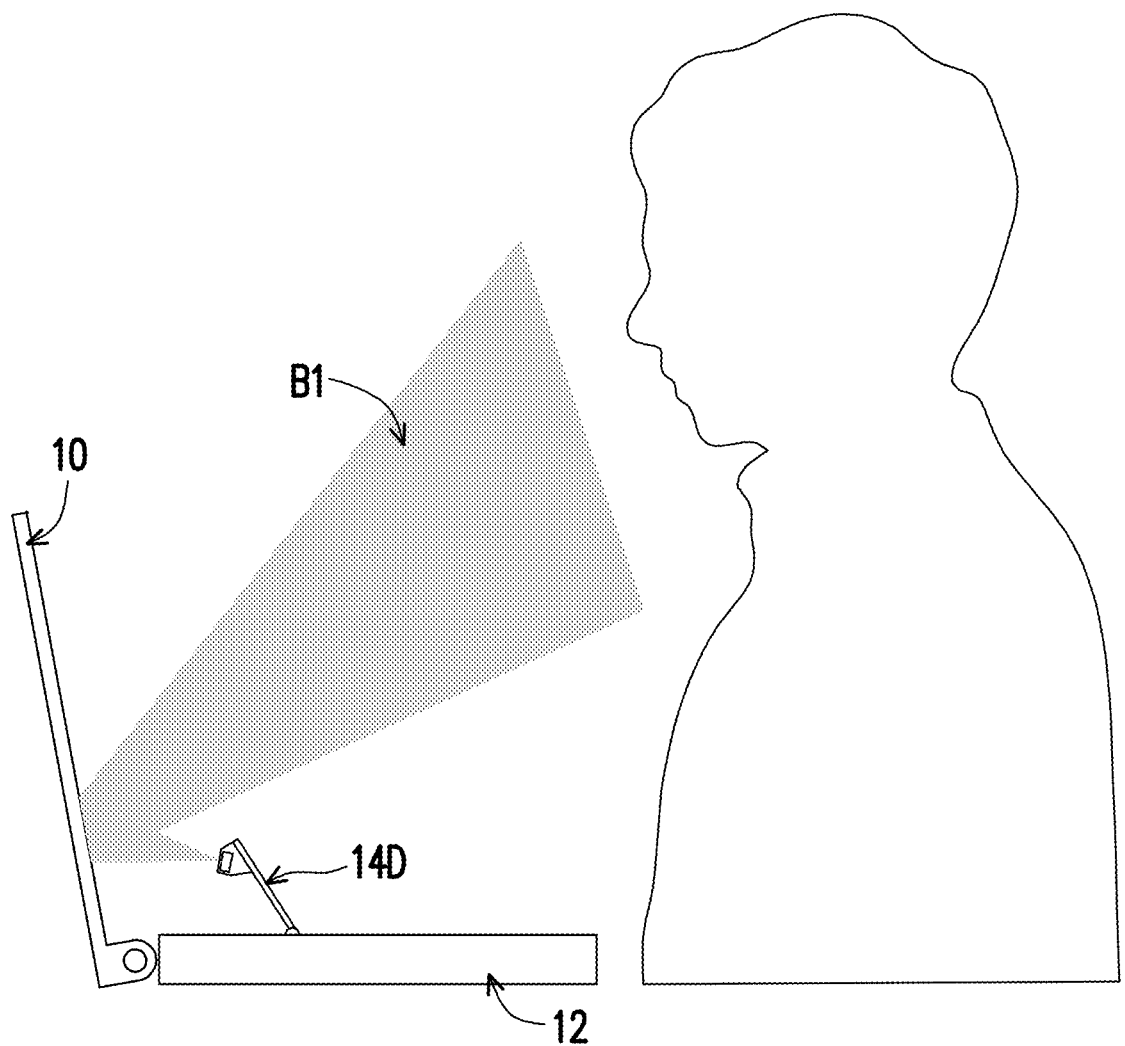
FIG. 17C is a schematic view of a light path, illustrating that the image light from the user is transmitted to the photosensitive element through a single reflection.

FIGS. 17A and 17B respectively are schematic cross-sectional views of a notebook computer in the open state and the closed state according to some embodiments of the invention. FIG. 17C is a schematic view of a light path, illustrating that the image light from the user is transmitted to the photosensitive element through a single reflection.

Referring to FIGS. 17A to 17C, the main differences between a notebook computer 1D and the aforementioned notebook computer 1C are explained as follows.

In the notebook computer 1D, a camera module 14D includes the photosensitive element 140, the first polarizer 142, the case 146, and a torsion spring 148C, and does not include the aforementioned power module 148B. The torsion spring 148C is disposed at the terminal of the case 146 away from the photosensitive element 140 and the first polarizer 142. When the camera module 14D is in the work state, the torsion spring 148C allows the case 146 to be raised the predetermined distance ZB, so that the photosensitive element 140 and the first polarizer 142 protrude from the body 12.

In some embodiments, for example, when the dimension of the notebook computer 1D is 13 inches to 17 inches, as shown in FIG. 17A, when the camera module 14D is in the work state, the distance Y (for example, the distance between the bottom edge of the display area R10 and the photosensitive element 140 in the third direction D3) between the display area R10 of the screen 10 and the photosensitive element 140 is between 9 mm and 300 mm, and is preferably 10 mm; the predetermined distance ZB is, for example, between 5 mm and 300 mm, and preferably between 3 mm and 30 mm; the included angle $\theta1$ between the screen 10 and the body 12 is, for example, between 0 degrees and 135 degrees, and preferably 125 degrees; an included angle $\theta6$ between the case 146 and the body 12 is, for example, between 0 degrees and 90 degrees, and preferably between 45 degrees and 60 degrees; an included angle $\theta7$ (for example, the included angle between the normal line of the first polarizer 142 and the extending direction of the case 146) between the first polarizer 142 and the case 146 is between 5 degrees and 90 degrees, for example.

Figure 18:
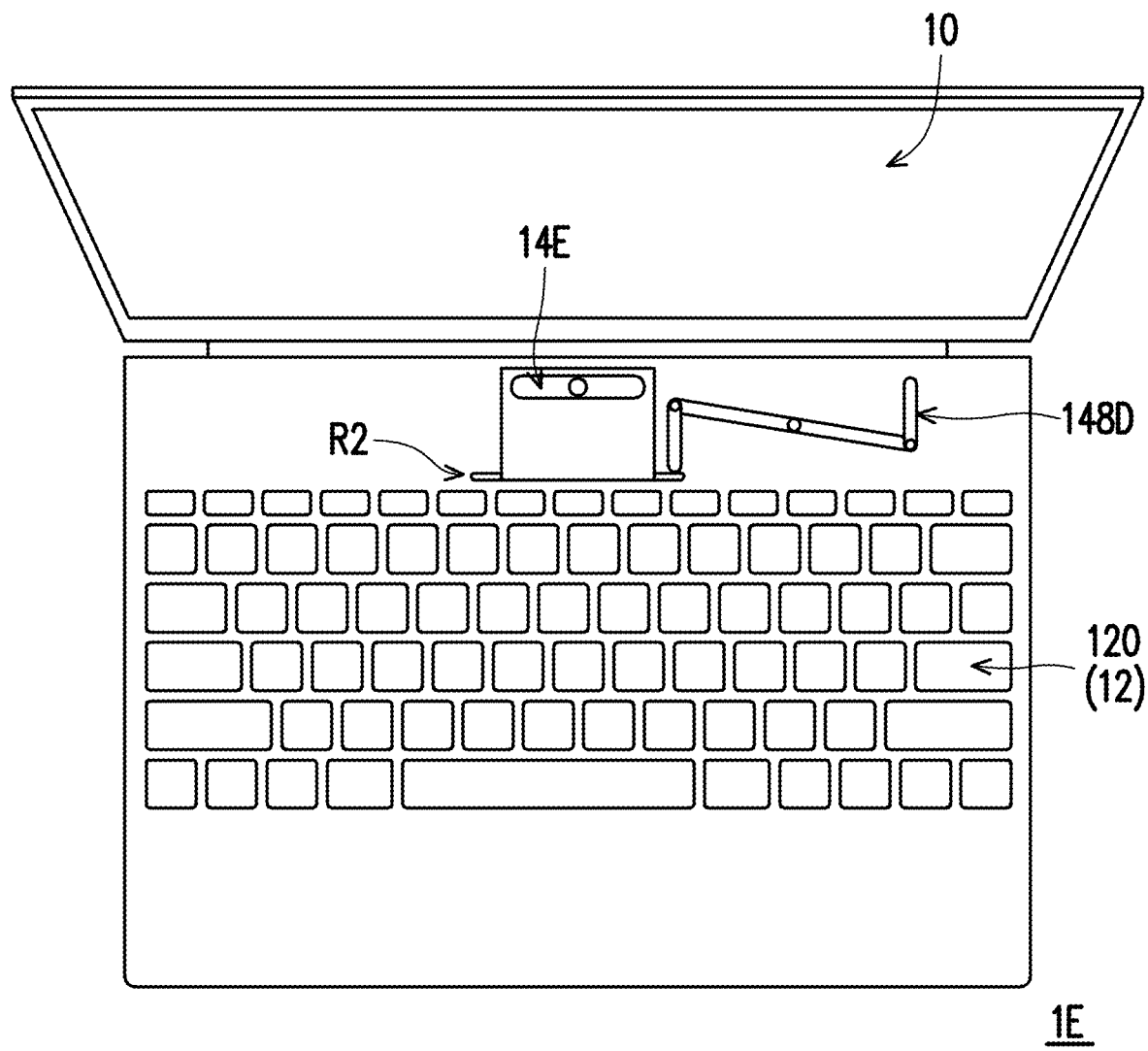
FIG. 18 is a top schematic view of a notebook computer in the open state according to some embodiments of the invention.
Figure 19:
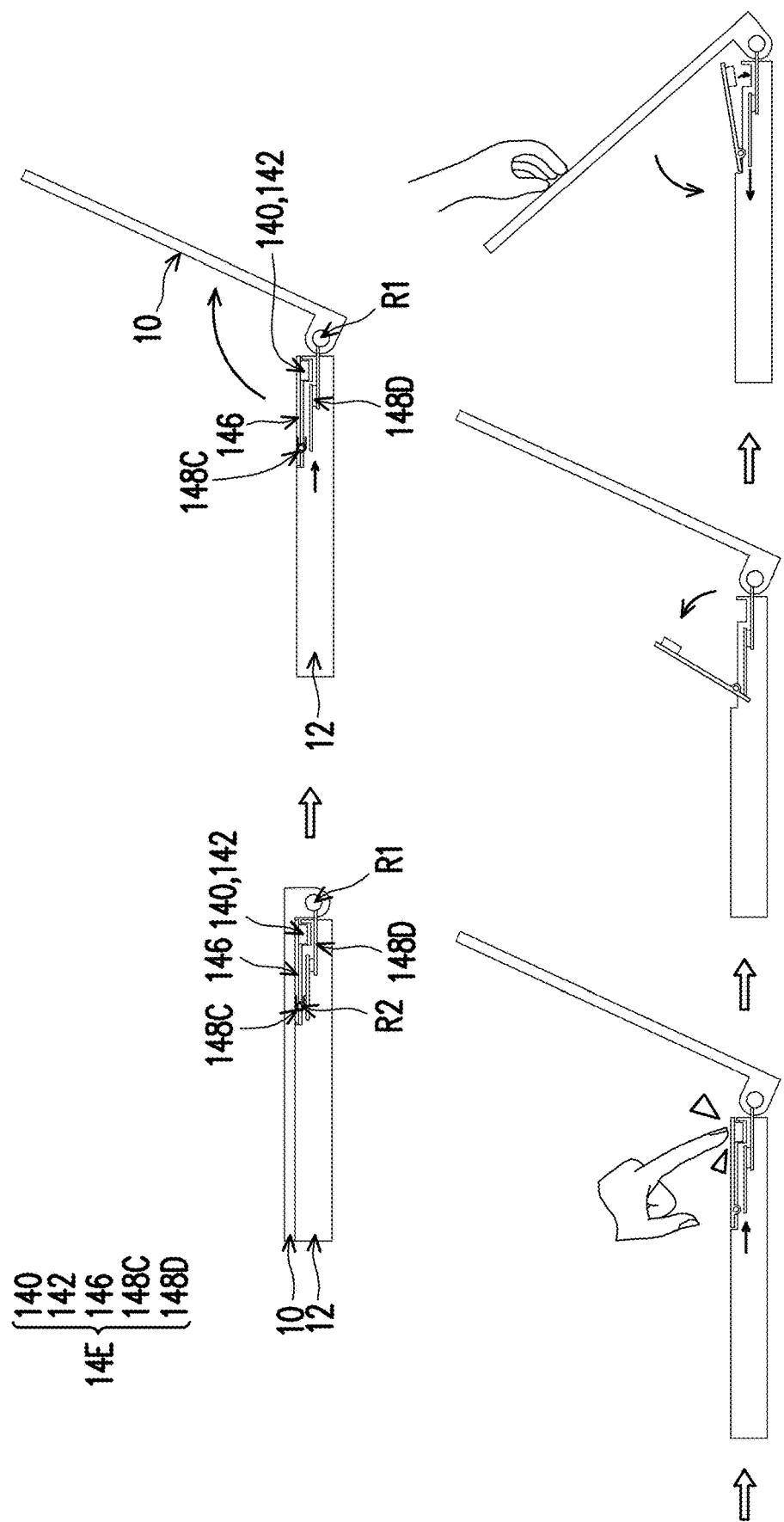
FIG. 19 is a schematic view of the operation of a notebook computer according to some embodiments of the invention.
Figure 20:
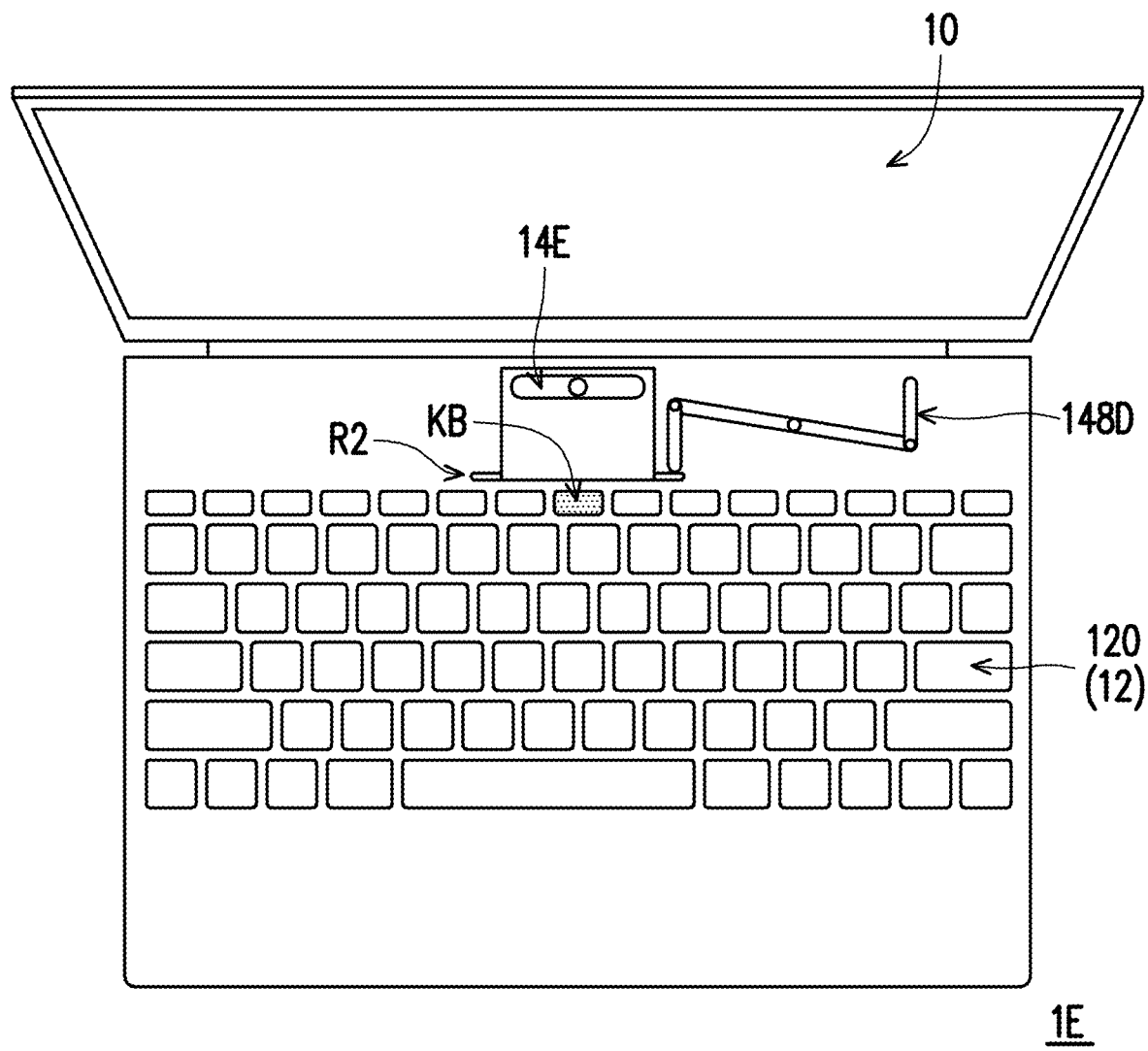
FIG. 20 is a top schematic view of a notebook computer in the open state according to some embodiments of the invention.
Figure 21:
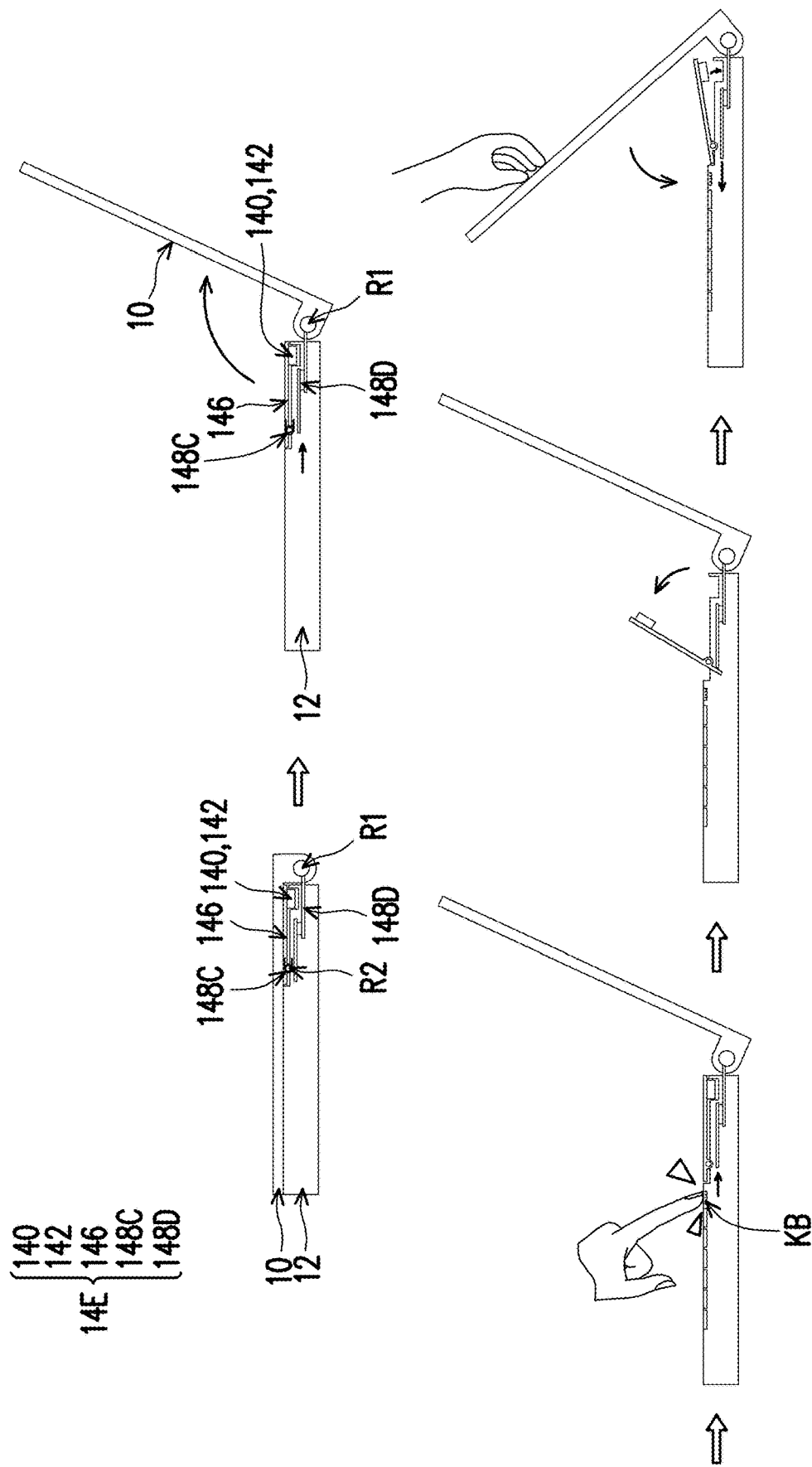
FIG. 21 is a schematic view of the operation of a notebook computer according to some embodiments of the invention.

FIG. 18 is a top schematic view of a notebook computer in the open state according to some embodiments of the invention. FIG. 19 is a schematic view of the operation of a notebook computer according to some embodiments of the invention. FIG. 20 is a top schematic view of a notebook computer in the open state according to some embodiments of the invention. FIG. 21 is a schematic view of the operation of a notebook computer according to some embodiments of the invention.

Referring to FIGS. 18 and 19, the main differences between the notebook computer 1E and the aforementioned notebook computer 1D are explained as follows.

In the notebook computer 1E, in addition to the photosensitive element 140, the first polarizer 142, the case 146, and the torsion spring 148C, a camera module 14E further includes a connecting rod structure 148D.

The connecting rod structure 148D is connected to the hinge R1 of the screen 10. After the screen 10 is opened, the camera module 14E may be pressed to release the pre-force to drive the case 146 up. The hinge R1 may have a concave-convex wheel structure to connect to the Z-shaped connecting rod structure 148D, so as to push the case 146 up to a predetermined distance to form an ideal shooting angle. When the screen 10 is switched from the open state to the closed state, the connecting rod structure 148D exerts an external force on the case 146, so that the case 146 is switched from the inclined state to the horizontal state. In other words, when the screen 10 is closed, the connecting rod structure 148D may be used to drive the case 146 to be stored in the body 12 to prevent the camera module 14E and the screen 10 from colliding and breaking, which provides safety and convenience.

In other embodiments, as shown in FIGS. 20 and 21, the pre-force may be released by pressing a key KB in the keyboard 120, thereby driving the case 146 up.

Figure 22A:
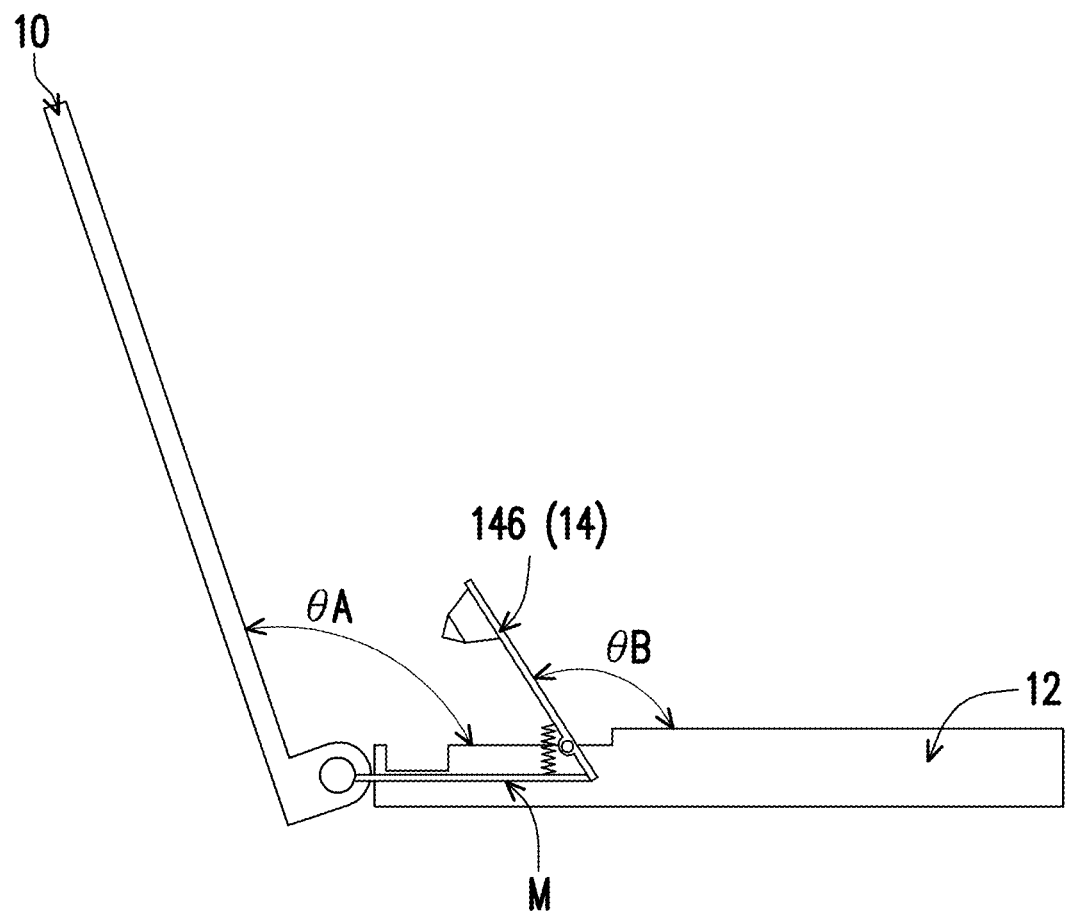
FIGS. 22A and 22B respectively are schematic cross-sectional views of a notebook computer in the open state according to some embodiments of the invention, respectively illustrating a screen and a case acting together through a connecting rod structure.
Figure 22B:
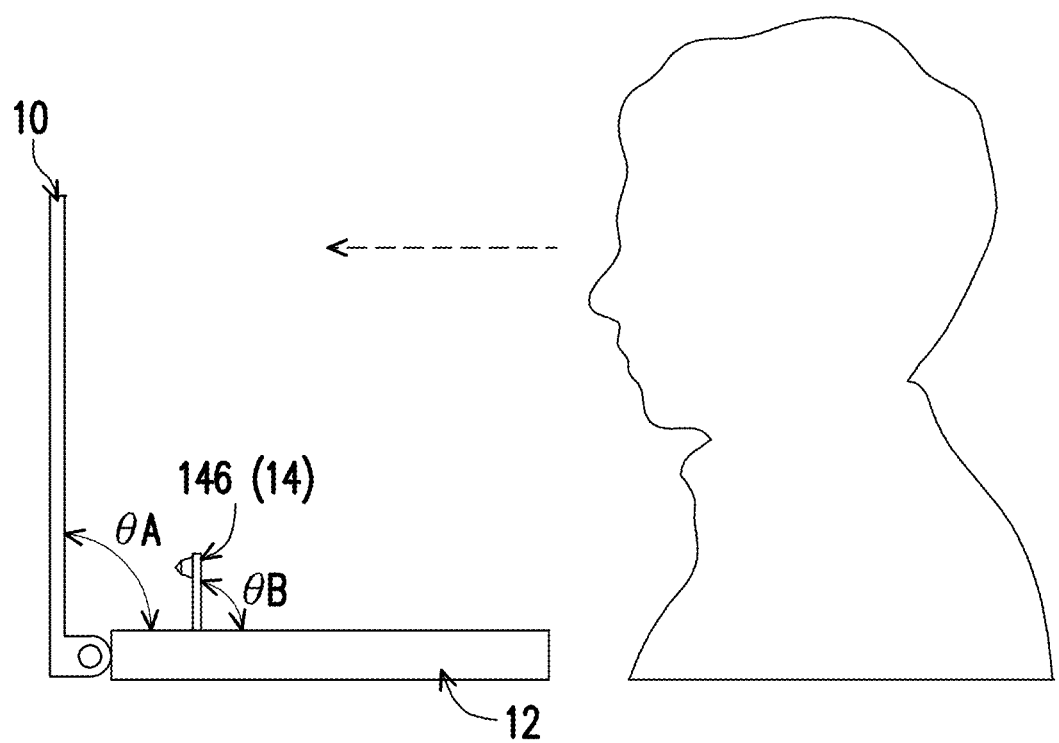

FIGS. 22A and 22B respectively are schematic cross-sectional views of a notebook computer in the open state according to some embodiments of the invention, respectively illustrating the screen and the case acting together through a connecting rod structure. Referring to FIGS. 22A and 22B, in order to meet the need of adjusting a screen opening and closing angle $\theta A$ (for example, the angle between the screen 10 and the body 12) according to the user's height or viewing angle, a mechanism M (for example, the connecting rod structure or other elements) may be used to allow the case 146 and the screen 10 to be linked and work together. By allowing the opening and closing angle $\theta A$ of the screen 10 and an inclination angle $\theta B$ (for example, the angle between the extending direction of the case 146 and the body 12) of the case 146 to be similar or parallel to each other, the effect of the first polarizer filtering the image light emitted by the screen 10 may be improved.

Figure 23:
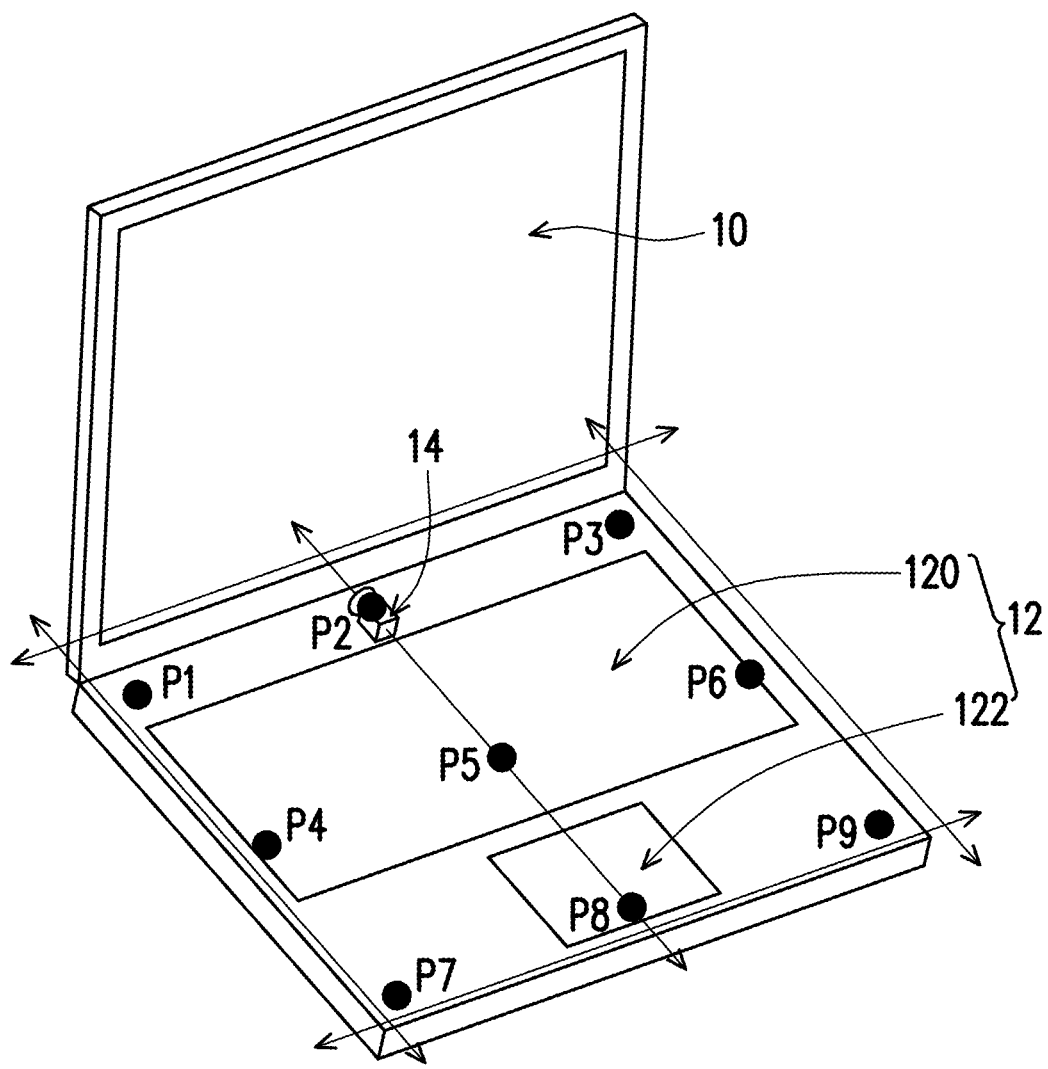
FIG. 23 is a side schematic view of a notebook computer in the open state according to some embodiments of the invention.

FIG. 23 is a side schematic view of a notebook computer in the open state according to some embodiments of the invention. Referring to FIG. 23, in the above-mentioned embodiment, the camera module 14 is disposed at the middle (as shown by a position P2) of a side of the body 12 adjacent to the screen 10, but the invention is not limited thereto. In other embodiments, the camera module 14 may be disposed on the left side (as shown by a position P1) or on the right side (as shown by a position P3) of a side of the body 12 adjacent to the screen 10. Alternatively, the camera module 14 may be combined with a key in the keyboard 120, such as at a position P4, a position P5, or a position P6. Alternatively, the camera module 14 may be disposed at a position of the body 12 adjacent to the touchpad 122, such as a position P7, a position P8, or a position P9. However, it should be understood that the position of disposing the camera module 14 may be changed according to needs, and is not limited to that shown in FIG. 23.

Figure 24:
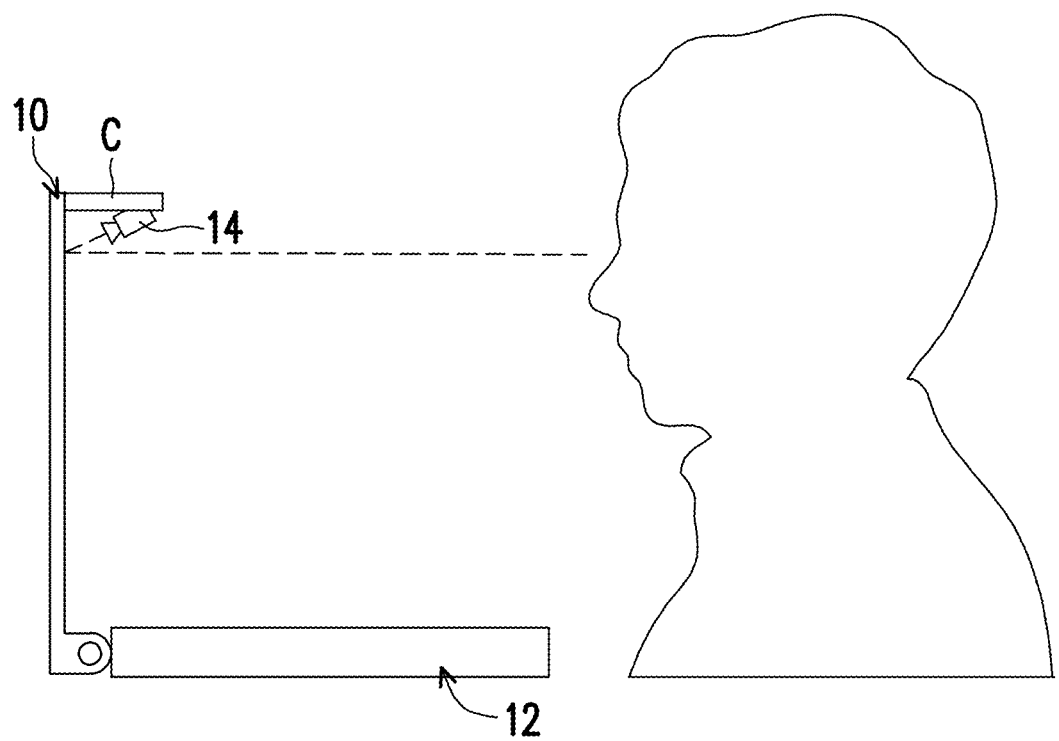
FIGS. 24 and 25 are side schematic views of a notebook computer in the open state according to some embodiments of the invention.
Figure 25:
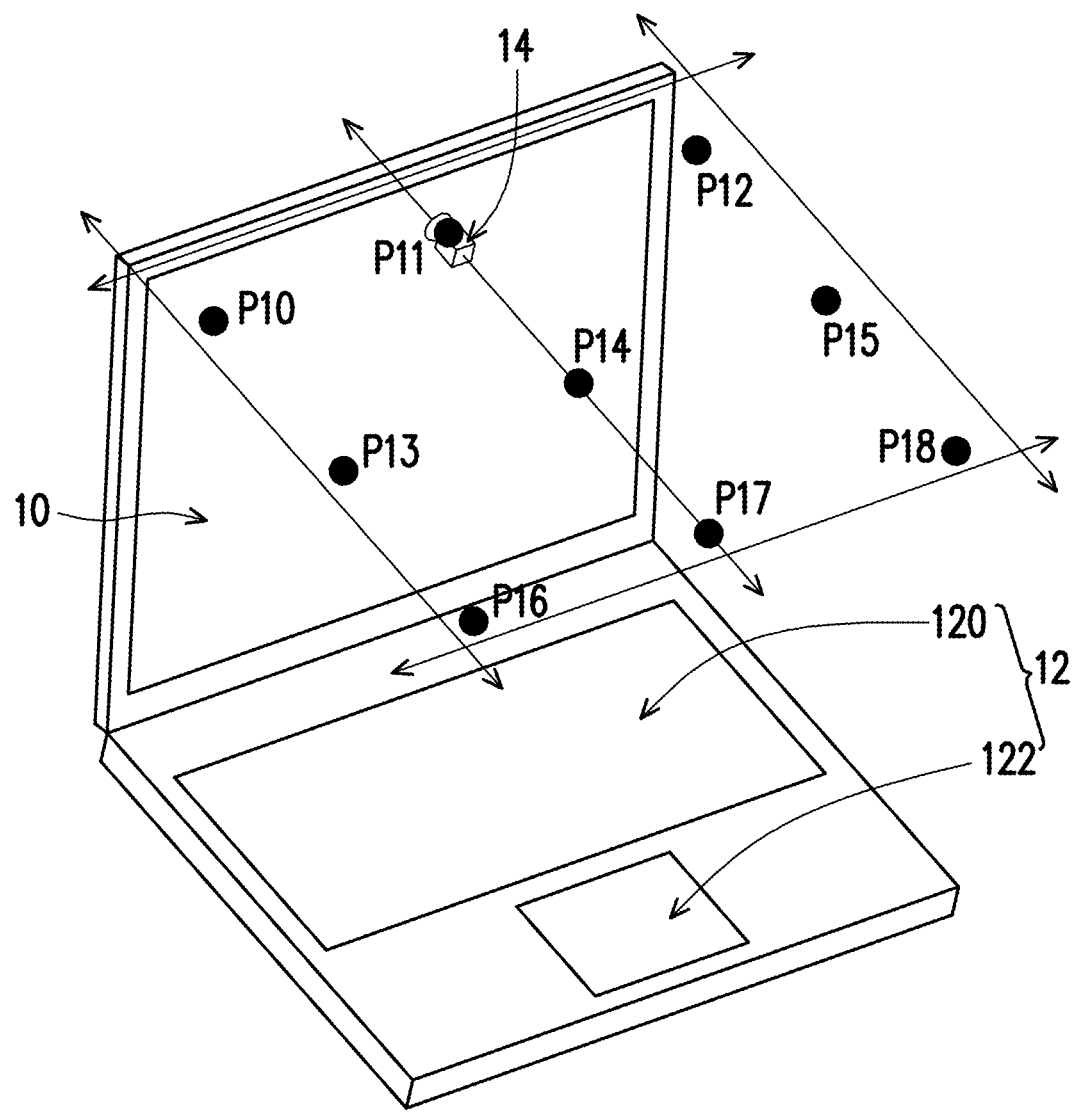

Although the above-mentioned embodiments all show that the camera module 14 is stored in the body 12, the invention is not limited thereto. FIGS. 24 and 25 are side schematic views of a notebook computer in the open state according to some embodiments of the invention. Referring to FIGS. 24 and 25, the camera module 14 may be stored in the screen 10, and may protrude from the screen 10 when the camera module 14 is in the work state. For example, through a board or a connecting part C, the camera module 14 may be disposed at a position P10 to a position P18 in front of the screen 10 and face the screen 10. However, it should be understood that the position of disposing the camera module 14 may be changed according to needs, and is not limited to that shown in FIG. 25.

In summary, in the embodiment of the invention, the image light from the user is reflected to the photosensitive element through a light-reflecting element such as a screen, so that the problem of poor shooting angles caused by the position of disposing the camera module may be avoided. In addition, the image light emitted from the screen is filtered through the first polarizer disposed between the screen and the photosensitive element, so that the photosensitive element may obtain a clear user image.

Although the disclosure has been disclosed in the above by way of embodiments, the embodiments are not intended to limit the disclosure. Those with ordinary knowledge in the technical field can make various changes and modifications without departing from the spirit and scope of the disclosure. Therefore, the protection scope of the disclosure is subject to the scope of the appended claims.

What is claimed is:
1. A notebook computer, comprising:
a screen;

a body, pivotally connected to the screen, so that the screen is opened and closed relative to the body; and
a camera module, stored in one of the screen and the body, comprising:
a photosensitive element; and
a first polarizer, disposed between the screen and the photosensitive element,
wherein the screen comprises a display panel and a second polarizer, the second polarizer is disposed between the display panel and the first polarizer, and the first polarizer and the second polarizer have different polarization directions.

2. The notebook computer according to claim 1, wherein when the camera module is in any one of a non-work state and a work state, the photosensitive element and the first polarizer are stored in the body.

3. The notebook computer according to claim 2, wherein the first polarizer is horizontally disposed in the body, and the camera module further comprises:
a light-reflecting element, pivotally connected to the body, wherein the first polarizer is disposed between the light-reflecting element and the photosensitive element, and when the camera module is switched from the non-work state to the work state, the light-reflecting element is switched from a horizontal state to an inclined state.

4. The notebook computer according to claim 3, wherein when the light-reflecting element is in the inclined state, a distance between a display area of the screen and the photosensitive element is between 9 mm and 45 mm, a distance between the display area of the screen and the light-reflecting element is between 9 mm and 50 mm, a height of the light-reflecting element is between 2 mm and 50 mm, an angle between the screen and the body is between 0 degrees and 135 degrees, and an angle between the light-reflecting element and the first polarizer is between 0 degrees and 85 degrees.

5. The notebook computer according to claim 4, wherein the photosensitive element faces the light-reflecting element, and an angle between the photosensitive element and the first polarizer is between 20 degrees and 45 degrees.

6. The notebook computer according to claim 2, wherein the photosensitive element and the first polarizer are both disposed in the body in an inclined manner, and the photosensitive element faces the screen.

7. The notebook computer according to claim 6, wherein a distance between a display area of the screen and the photosensitive element is between 9 mm and 45 mm, an angle between the screen and the body is between 0 degrees and 135 degrees, and an inclination angle of the first polarizer is between 5 degrees and 85 degrees.

8. The notebook computer according to claim 1, wherein when the camera module is in a non-work state, the photosensitive element and the first polarizer are stored in the body, and when the camera module is in a work state, the photosensitive element and the first polarizer protrude from the body.

9. The notebook computer according to claim 8, wherein the camera module further comprises:
a case, storing the photosensitive element and the first polarizer, wherein when the camera module is in the non-work state, the case is stored in the body, and when the camera module is in the work state, the case protrudes from the body.

10. The notebook computer according to claim 9, wherein the camera module further comprises:

an elastic element, disposed between the case and the body, wherein when the camera module is in the work state, the elastic element allows the case to be raised a predetermined distance, so that the photosensitive element and the first polarizer protrude from the body.

11. The notebook computer according to claim 10, wherein when the camera module is in the work state, a distance between a display area of the screen and the photosensitive element is between 9 mm and 300 mm, the predetermined distance is between 3 mm and 30 mm, an angle between the screen and the body is between 90 degrees and 135 degrees, and an inclination angle of the first polarizer is between 90 degrees and 150 degrees.

12. The notebook computer according to claim 9, wherein the camera module further comprises:
a power module, connected to the case, controlling the case to be switched between a horizontal state and an inclined state, wherein when the camera module is in the work state, the power module allows the case to be raised a predetermined distance, so that the photosensitive element and the first polarizer protrude from the body.

13. The notebook computer according to claim 12, wherein when the camera module is in the work state, a distance between a display area of the screen and the photosensitive element is between 9 mm and 300 mm, the predetermined distance is between 3 mm and 30 mm, an angle between the screen and the body is between 90 degrees and 135 degrees, and an inclination angle of the first polarizer is between 5 degrees and 60 degrees.

14. The notebook computer according to claim 9, wherein the camera module further comprises:
a torsion spring, disposed at a terminal of the case away from the photosensitive element and the first polarizer, wherein when the camera module is in the work state, the torsion spring allows the case to be raised a predetermined distance, so that the photosensitive element and the first polarizer protrude from the body.

15. The notebook computer according to claim 14, wherein when the camera module is in the work state, a distance between a display area of the screen and the photosensitive element is between 9 mm and 300 mm, the predetermined distance is between 5 mm and 300 mm, an angle between the screen and the body is between 0 degrees and 135 degrees, an angle between the case and the body is between 0 degrees and 90 degrees, and an angle between the first polarizer and the case is between 5 degrees and 90 degrees.

16. The notebook computer according to claim 9, wherein the body comprises:
a connecting rod structure, connected to a hinge of the screen, wherein when the screen is switched from an open state to a closed state, the connecting rod structure exerts an external force on the case, so that the case is switched from an inclined state to a horizontal state.

17. The notebook computer according to claim 1, wherein when the camera module is in a non-work state, the photosensitive element and the first polarizer are stored in the screen, and when the camera module is in a work state, the photosensitive element and the first polarizer protrude from the screen.

18. The notebook computer according to claim 1, wherein a reflectance of the screen in a visible light band is greater than or equal to 2% and less than or equal to 75%.

19. The notebook computer according to claim 1, wherein a surface roughness of the screen is less than or equal to 0.012Ra.

* * * * *